(12) United States Patent
Caldwell

(10) Patent No.: US 8,903,232 B1
(45) Date of Patent: Dec. 2, 2014

(54) OPTICAL ATTACHMENT FOR REDUCING THE FOCAL LENGTH OF AN OBJECTIVE LENS

(71) Applicant: Caldwell Photographic, Inc., Petersburg, VA (US)

(72) Inventor: J. Brian Caldwell, Petersburg, VA (US)

(73) Assignee: Caldwell Photographic, Inc., Petersburg, VA (US)

( * ) Notice: Subject to any disclaimer, the term of this patent is extended or adjusted under 35 U.S.C. 154(b) by 0 days.

(21) Appl. No.: 14/329,896

(22) Filed: Jul. 12, 2014

Related U.S. Application Data

(60) Provisional application No. 61/862,294, filed on Aug. 5, 2013.

(51) Int. Cl.
*G03B 17/14* (2006.01)
*G03B 17/56* (2006.01)
*G02B 9/00* (2006.01)

(52) U.S. Cl.
CPC ............... *G03B 17/565* (2013.01); *G02B 9/00* (2013.01)
USPC ............................................ 396/71; 359/686

(58) Field of Classification Search
CPC ........................................................ G03B 17/14
USPC ............................................................ 396/71
See application file for complete search history.

(56) References Cited

U.S. PATENT DOCUMENTS

| | | | |
|---|---|---|---|
| 2,186,605 | A | 1/1940 | Herzberger |
| 4,264,151 | A | 4/1981 | Okano |
| 4,634,235 | A | 1/1987 | Fujioka |
| 4,830,474 | A | 5/1989 | Nakayama et al. |
| 5,499,069 | A | 3/1996 | Griffith |
| 6,373,638 | B1 * | 4/2002 | Kohno .......................... 359/675 |
| 2005/0286139 | A1 * | 12/2005 | Nishimura .................... 359/686 |
| 2010/0165480 | A1 * | 7/2010 | Yamaguchi et al. .......... 359/686 |

* cited by examiner

*Primary Examiner* — Clayton E LaBalle
*Assistant Examiner* — Dennis Hancock
(74) *Attorney, Agent, or Firm* — Opticus IP Law PLLC

(57) ABSTRACT

An optical attachment having five or six elements and configured to be operably arranged on the image side of an objective lens to reduce the focal length and focal ratio of the objective lens is disclosed. The optical attachment is particularly suitable for adapting objective lenses designed with a relatively large working distance for a large format size to cameras having a smaller format size and relatively small permissible working distance. The optical attachments disclosed herein have high image quality at large aperture over a large field of view, and can be well-corrected for all major aberrations.

18 Claims, 13 Drawing Sheets

OPTICAL ATTACHMENT FOR REDUCING THE FOCAL LENGTH OF AN OBJECTIVE LENS

CROSS-REFERENCE TO RELATED APPLICATIONS

This application claims priority under 35 USC 119 from U.S. Provisional Patent Application Ser. No. 61/862,294, filed on Aug. 5, 2014, and which is incorporated by reference herein.

This application is related to U.S. Pre-Grant Pub. No. US2013/0064532, which has U.S. Patent App. Ser. No. 61/589,880, and which is entitled "Optical Attachment for Reducing the Focal Length of an Objective Lens," and which is incorporated herein by reference.

The entire disclosure of any publication or patent document mentioned herein is incorporated by reference.

FIELD

The present disclosure is directed to an optical attachment placed on the image side of an objective lens in order to reduce the focal length and focal ratio of that objective lens. The present disclosure is particularly suitable for adapting objective lenses designed with a relatively large working distance for a large format size to cameras having a smaller format size and relatively small permissible working distance.

BACKGROUND ART

Optical attachments for reducing the focal length of an objective lens, also known as focal reducers, are described in the aforementioned U.S. Pre-Grant Pub. No. Number US2013/0064532. The attachments described in US2013/0064532 comprise four lens elements, in order from an object side to an image side: a first lens element having a first negative power and an object-side concave surface; a second lens element having a first positive power and an object-side surface having a curvature CvOb2; a third lens element having a second negative power greater than the first negative power and having an image-side surface having a curvature CvIm3; a fourth lens element having a second positive power and an image-side surface; and wherein the focal reducing attachment has an overall power $\phi$ such that $(CvOb2+CvIm3)/\phi > 3$ and an overall magnification M such that $0.5 < M < 1$.

Although the focal reducers described in Publication Number US2013/0064532 function well in a variety of applications, they have limitations imposed by their relatively simple structure. Among these limitations are chromatic aberration, field curvature, and high-order coma. These limitations become particularly evident when designing focal reducers having a magnification less than 0.7, where aberrations are found to increase dramatically when an attempt is made to reduce the magnification below about 0.7.

SUMMARY

It has been found that by splitting one or two of the four lens elements in the four-element structure disclosed in Publication Number US2013/0064532 into two elements, either cemented or air-spaced, that a significant improvement in optical correction can be achieved. In particular, splitting the second and/or fourth of the four lens elements into either a cemented or air-spaced doublet has been found to be especially effective in reducing aberrations.

Accordingly, the present disclosure is directed to an optical attachment comprising five or six lens elements configured to be operably arranged on the image side of an objective lens in order to reduce the focal length and focal ratio of the objective lens. The present disclosure is particularly suitable for adapting objective lenses designed with a relatively large working distance for a large format size to cameras having a smaller format size and relatively small permissible working distance. Optical attachments designed according to the present disclosure have very high image quality at large aperture over a large field of view. In particular, these attachments are simultaneously well-corrected for all major aberrations even when the magnification of the attachment is 0.71 or less. Optical attachments designed according to the present disclosure may also have substantially improved performance compared to attachments with similar specifications designed according to US2013/0064532.

An aspect of the disclosure is a focal reducing attachment having an object side, an image side, an optical power $\phi$, a magnification M, and comprising: a total of five or six lens elements arranged in four lens groups G1, G2, G3 and G4 in order from the object side to the image side, and wherein: a) lens group G1 has an optical power $\phi_{G1}$, wherein $-1 < \phi_{G1}/\phi < -0.001$, and including a most object-side-wise negative lens element that defines a most object-side-wise concave surface; b) lens group G2 has positive power and has a positive lens element with a most object-side facing surface having a curvature CvOb2; c) lens group G3 having negative power and having a negative lens element with a most image-side-facing surface having a curvature CvIm3; d) a positive powered lens group G4; and wherein $2 < (CvOb2+CvIm3)/\phi < 30$ and $0.3 < M < 1.0$.

Another aspect of the disclosure is a lens system that includes the focal reducing attachment described above, and an objective lens operably attached to the focal reducer.

Another aspect of the disclosure is a camera system that includes the lens system as described above, and a mirrorless camera having a camera body with a mounting flange, wherein the lens system is operably attached to the camera body at the mounting flange.

Another aspect of the disclosure is the camera system as described above, wherein the mirrorless camera includes a camera body having an interior in which the one or more parallel plates are disposed.

Another aspect of the disclosure is a focal reducing attachment for use with an objective lens. The focal reducing attachment consists of, in order from an object side to an image side: a first lens group G1 having a first negative power and an object-side concave surface; a second lens group G2 having a first positive power and an object-side surface having a curvature CvOb2; a third lens group G3 having a second negative power greater than the first negative power and having an image-side surface having a curvature CvIm3; a fourth lens group G4 having a second positive power and an image-side surface; and one or more plane parallel plates that reside between the image sensor and the fourth lens element. The focal reducing attachment has an overall power $\phi$ such that $(CvOb2+CvIm3)/\phi > 3$ and an overall magnification M such that $0.5 \leq M \leq 1$. At least one of the lens groups G2 or G4 comprises a cemented or air-spaced doublet.

DETAILED DESCRIPTION

Figure 1:
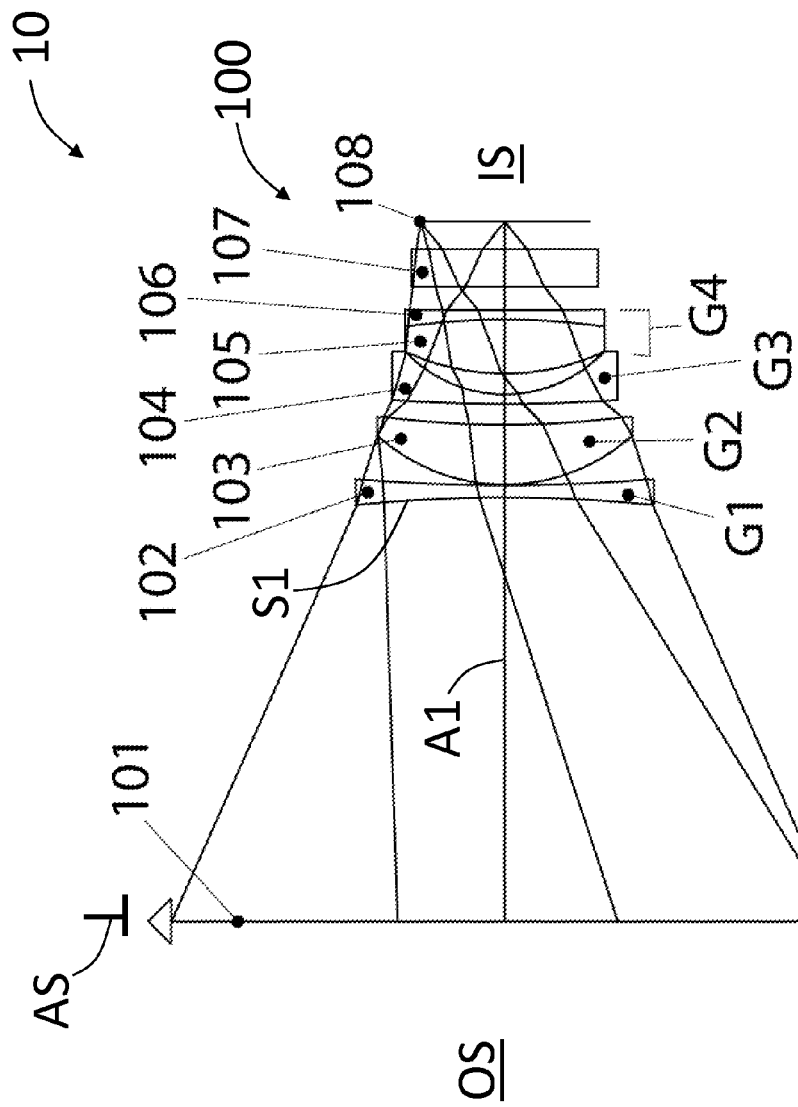
FIG. 1 is an optical layout of Example #1.

The claims set forth below are incorporated into and constitute part of this Detailed Description.

The present disclosure is directed to an optical attachment placed on the image side of an objective lens in order to reduce the focal length and focal ratio of that objective lens. The present disclosure is particularly suitable for adapting objective lenses designed with a relatively large working distance for a large format size to cameras having a smaller format size and relatively small permissible working distance.

Focal reducing attachments designed according to the present disclosure comprise five or six powered optical elements arranged into four lens groups in the following order from an object side: 1) a weak negative-powered lens group comprising a single lens element; 2) a first positive-powered lens group; 3) a negative-powered lens group; and 4) a second positive-powered lens group. In the discussion below, these four lens groups will be referred to as G1, G2, G3 and G4, respectively. One or two of the four lens groups is split into two lens elements, either as a cemented or air-spaced doublet. In addition to the above-mentioned powered optical elements, focal reducers designed according to the present disclosure may also include one or more plane parallel plates. Such plates will most often be encountered on the image side of G4, and they are used to model the various coverglasses and filters that are built-in to most digital cameras.

The unusually high optical performance of focal reducing attachments designed according to the present disclosure is made possible by a combination of three important features. The first important feature is that the object-facing surface of G2 and the image-facing surface of the G3 are strongly curved toward the image plane, which reduces field curvature and astigmatism to very low levels. In the case of G2 the object-facing surface is convex, and in the case of G3 the image-facing surface is concave. In both cases the sign of the curvature will be positive, using normal optical sign convention. The strongly curved concave surface on the image-facing surface of G3 additionally enables excellent correction of distortion.

The second important feature is that the object-facing surface of G1 is concave toward the object, which reduces spherical aberration at very large apertures and also helps to flatten the field near the extreme corners of the image.

The third important feature is that one or two of the four lens groups G1 through G4 consists of two lens elements, either as a cemented or air-spaced doublet. Having one or two of such two-lens groups permits better correction of aberrations. In particular, having lens group G4 consist of a doublet lens permits better correction of astigmatism and lateral chromatic aberration, and having lens group G2 consist of a doublet lens permits better correction of field curvature and astigmatism, especially when the negative component of the doublet has low refractive index compared to that of the positive component.

Although for ease of manufacturing it is generally preferable to used cemented doublets, the use of air-spaced doublets can provide superior aberration correction in some circumstances. In the context of the present disclosure, an air-spaced doublet is understood to differ from a cemented doublet in that there is a small air gap between the two lens elements, and that the thickness of this air gap at any point within the clear aperture of the mating surfaces is not more than a few percent of the clear aperture diameter of the mating surfaces. In addition, the mating surfaces of an air-spaced doublet may have different radii of curvature, whereas the mating surfaces of a cemented doublet are identical or nearly identical.

It is useful to define a unitless quantity Q1 in connection with focal reducing attachments designed according to the present disclosure:

$$Q1=(CvOb2+CvIm3)/\phi,$$

where CvOb2 is the curvature of the object-facing (i.e., most object-wise or most object-side-wise) surface of the lens element in lens group G2; CvIm3 is the curvature of the image-facing (i.e., most image-wise or most image-side-wise) surface of the lens element in lens group G3; and $\phi$ is the optical power of the focal reducing attachment. In order to correct field curvature and astigmatism to acceptable levels it is necessary to ensure that the quantity Q1 has a value greater than two, and preferably a value greater than four. A practical upper limit for Q1 is thirty. If Q1 is greater than thirty, then the permissible maximum aperture and/or maximum image diagonal becomes very small, or else the surface curvatures become so great that they approach a hyper-hemispheric condition. Thus, in an example, 2<Q1<30.

It is also useful to define a unitless quantity Q2 in connection with focal reducing attachments designed according to the present disclosure:

$$Q2=VT\cdot\phi,$$

where VT is the vertex length, i.e., the thickness from the first to last vertex of the attachment, not counting any plane-parallel elements in the front or rear of the attachment, and $\phi$ is the optical power of the attachment. In order for the focal reducing attachment to be usable with a wide variety of objective lenses and cameras, the quantity Q2 should have a value less than 1.0, and preferably a value less than 0.7. If Q2 becomes too large then it means that the focal reducer is very thick, and will likely not function with a wide variety of objective lenses. The quantity Q2 should have a value greater than 0.05 in order to provide a reasonably large aperture and image diagonal while still maintaining adequate aberration correction.

It is also useful to define a third unitless quantity Q3 in connection with focal reducing attachments designed according to the present disclosure:

$$Q3=\phi_{G1}/\phi,$$

where $\phi_{G1}$ is the optical power of lens group G1, and $\phi$ is the optical power of the attachment as a whole. In order for the focal reducing attachment to have good aberration correction, especially correction of spherical aberration and astigmatism, it has been found that Q3 should have a value less than −0.001. Having a modest negative value for Q3 also helps to increase the working distance of the attachment. However, if Q3 becomes too negative then the optical power of the positive elements becomes too large in order to compensate and it is difficult to correct aberrations at large apertures. Accordingly, Q3 should have a value greater than −1.0, i.e., −1.0<Q3.

Various aberrations may be reduced my means of incorporating one or more aspheric surfaces in the design. In principle, any of the powered surfaces may be made aspheric. However, in practice certain surfaces are more desirable than others. For example, placing an asphere at a cemented interface might offer some interesting aberration correction possibilities, but it would require fabrication of two precisely mating aspheric surfaces, which would be very expensive. In general, if an asphere is located on a surface closer to the stop (and hence further from the image plane) then it will have a greater impact on aberrations having a large dependence on the pupil coordinate, such as spherical aberration and coma. If an asphere is located on a surface closer to the image plane (and hence further from the stop) then it will have a greater impact on aberrations having a large dependence on image height, such as astigmatism and distortion.

Focal reducing attachments designed according to the present disclosure may be well-corrected at extremely large apertures ranging down to about f/0.7 or even faster. Compatibility with larger apertures will generally require larger clear apertures of both surfaces of all four lens groups, especially the clear apertures of G1. Care must be taken in designing a practical attachment in order to avoid mechanical interference between G1 and any mechanical protrusions of the attached objective lens.

Detailed data for example embodiments are provided below. Tables 1a, 2a, 3a, 4a, 5a, 6a, 7a, 8a, 9a, 10a and 11a provide prescription data for Examples 1-11, respectively. Tables 1b, 2b, 3b, 4b, 5b, 6b, 7b, 8b, 9b, 10b and 11b provide specification data for Examples 1-11, respectively. Four of the examples (Example 7, 8, 9 and 10) incorporate aspherical surfaces which are expressed by the following equation:

$$Z = r^2/(R(1+SQRT(1-(1+k)r^2/R^2))) + C4r^4 + C6r^6 + C8r^8 + C10r^{10}$$

Where Z is the displacement in the direction of the optical axis measured from the polar tangent plane, r is the radial coordinate, R is the base radius of curvature, k is the conic constant, and Ci is the i-th order aspherical deformation constant. Tables 7c, 8c, 9c and 10c provide aspheric surface data for examples 7 through 10, respectively. A listing of refractive index ($n_d$) and dispersion (Abbe number, or $v_d$) for all of the glass types used in the Examples is provided in Table 12.

Example 1

FIG. 1 is a layout of Example 1 of the present disclosure, which is an example focal-reducing attachment ("attachment") 100 having an axis A1, an aperture stop AS, an object side OS, and an image plane 108 that defines an image side IS. The example attachment 100 has a focal length f of 65.8 mm and a magnification M of 0.64×. In order to evaluate optical performance, an objective lens 101 is included. For modeling purposes, the objective lens 101 is treated paraxially and in Example 1 has a focal length of 80 mm, with the objective lens 101 being placed 45.3 mm toward the object side OS of the attachment 100. The combination of the objective lens 101 and attachment 100 defines a lens system 10.

Although the aperture stop AS for the attachment 100 is shown as being coincident with the objective lens 101 for the purpose of aberration evaluation, it may be moved axially over a wide range of values so that it will correspond with the exit pupil location of an actual attached objective lens. In practice, the attached objective lens 101 will normally determine the actual location of the aperture stop AS and system exit pupil since it will generally have an iris mechanism (not shown). Example 1 is designed to be compatible with a wide range of objective lens exit pupil distances.

The example attachment 100 of FIG. 1 comprises five (powered) optical elements 102 through 106 in order from the object side OS to the image side IS: 1) a weak negative element 102 with a concave object-facing surface S1; 2) a strong positive meniscus element 103; 3) a strong negative meniscus element 104; and 4) a positive-powered cemented doublet comprising a biconvex positive element 105 and a biconcave negative element 106.

A plane-parallel plate 107 is optionally operably disposed immediately adjacent image plane 108 to represent a filter stack in the lens system 10. The filter stack can comprise at least one of a coverglass, an anti-aliasing filter, and an IR absorbing filter. The axial location of the plane-parallel plate 107 has no impact on optical performance, meaning it can be moved back and forth along the optical axis A1 without changing the aberration correction.

In the example attachment 100 of FIG. 1, the image plane 108 is located approximately 74.8 mm from the 80 mm objective lens 101. This means that the lens system 10 has a vertex length that is 6.567 mm shorter than the objective lens 101 alone plus the same plane-parallel plate 107. Both lens elements 103 and 105 are made from high index crown glasses in order to minimize aberrations and to keep attachment 100 as compact as possible. Lens element 104 is made from a highly dispersive flint glass in order to correct chromatic aberrations.

In Example 1, lens group G1 has the single negative element 102; lens group G2 has the single positive element 103; lens group G3 has the single negative element 104; and lens group G4 has the positive cemented doublet comprising the positive element 105 and the negative element 106. By using a cemented doublet construction for lens group G4, lateral color has been reduced. Lateral color correction has been further enhanced (i.e., reduced) by forming lens element 106 from an anomalous dispersion short flint glass (e.g., Ohara S-NBH51).

Example 1 has a magnification M of 0.64×, which means that it reduces the focal length by a factor of 0.64 and it also increases the relative aperture of the objective lens 101 by 1.29 stops. For example, if the attachment 100 is placed behind a 100 mm f/2.8 objective lens 101, the resulting lens system 10 has a focal length of 64 mm and an aperture of f/1.8. The image circle of the objective lens 101 is also reduced by a factor of 0.64. This means that in order to take full advantage of the 18.2 mm diameter image circle capacity of Example 1, the objective lens 101 must have an image circle diameter of at least 18.2/0.64=28.4 mm. Since all FX format SLR objective lenses covering a standard 24×36 mm format and DX format SLR objective lenses covering a standard 18×24 mm format have an image circle diameter greater than 28.4 mm there are a large number of suitable objective lenses 101 to choose from.

Detailed prescription data for Example 1 is given in Table 1a below. Specification data for Example 1 is given in Table 1b below.

TABLE 1a

Prescription Data for Example 1

| Surf | Type | Radius | Thickness | Glass | Diameter |
|---|---|---|---|---|---|
| OBJ | STANDARD | Infinity | Infinity | | 0 |
| STO | PARAXIAL | — | 45.3 | | 71.58897 |
| 2 | STANDARD | −157.2464 | 1.3 | S-FSL5 | 32 |
| 3 | STANDARD | 189.7566 | 0.0813055 | | 30.8 |
| 4 | STANDARD | 20.50922 | 6.399902 | H-ZLAF50B | 27.4 |
| 5 | STANDARD | 102.8064 | 2.234732 | | 26 |
| 6 | STANDARD | 187.7741 | 1 | H-ZF3 | 24.2 |
| 7 | STANDARD | 14.77561 | 2.223485 | | 21.3544 |
| 8 | STANDARD | 25.54313 | 5.757387 | S-LAH66 | 21.4 |
| 9 | STANDARD | −77.29634 | 1 | S-NBH51 | 21.4 |
| 10 | STANDARD | 740.2304 | 2.5 | | 20.8 |
| 11 | STANDARD | Infinity | 4 | H-KF6 | 20 |
| 12 | STANDARD | Infinity | 3 | | 20 |
| IMA | STANDARD | Infinity | | | 18.2 |

TABLE 1b

Specification Data for Example 1
EXAMPLE 1 - SPECIFICATIONS

| Focal Length | 65.8 mm |
|---|---|
| Magnification | 0.64x |
| Aperture Ratio | f/0.79 |
| Image Diagonal | 18.2 mm |
| CvOb2 | 0.04876 mm$^{-1}$ |
| CvIm3 | 0.06768 mm$^{-1}$ |
| Q1 | 7.66 |
| VT | 20.00 mm |
| Q2 | 0.30 |
| $\phi_{G1}$ | −0.005676 mm$^{-1}$ |
| Q3 | −0.3735 |

Example 2

Figure 2:
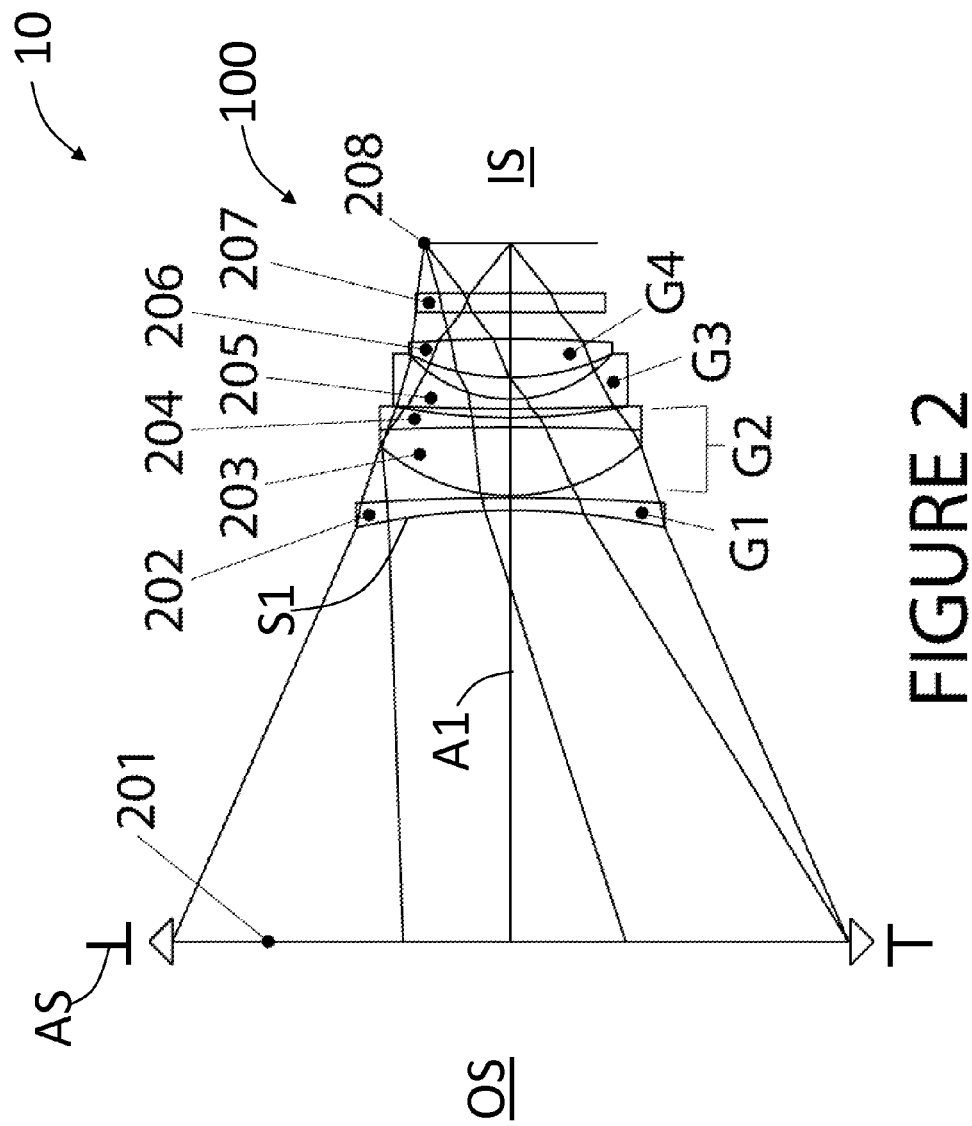
FIG. 2 is an optical layout of Example #2.

FIG. 2 is a layout of Example 2 of the present disclosure, which is an example attachment 100 having an axis A1, an aperture stop AS, an object side OS, and an image plane 208 that defines an image side IS. The example attachment 100 has a focal length f of 64.9 mm and a magnification M of 0.64×. In order to evaluate optical performance, an objective lens 201 is included. For modeling purposes, the objective lens 201 is treated paraxially and in Example 2 has a focal length of 80 mm, with the objective lens 201 being placed 45.3 mm toward the object side OS of the attachment 100. The combination of the objective lens 201 and attachment 100 defines a lens system 10.

Although the aperture stop AS for the attachment 100 is shown as being coincident with the objective lens 201 for the purpose of aberration evaluation, it may be moved axially over a wide range of values so that it will correspond with the exit pupil location of an actual attached objective lens. In practice, the attached objective lens 201 will normally determine the actual location of the aperture stop AS and system exit pupil since it will generally have an iris mechanism (not shown). Example 2 is designed to be compatible with a wide range of objective lens exit pupil distances.

The focal reducing attachment 100 of FIG. 2 comprises five (powered) optical elements 202 through 206 in order from the object side OS to the image side IS: 1) a weak negative element 202 with a concave object-facing surface S1; 2) a strong positive meniscus cemented doublet comprising a bi-convex positive element 203 and a bi-concave negative element 204; 3) a strong negative meniscus element 205; and 4) a positive element 206.

A plane-parallel plate 207 is optionally operably disposed immediately adjacent image plane 208 to represent a filter stack in the lens system 10. The filter stack can comprise at least one of a coverglass, an anti-aliasing filter, and an IR absorbing filter. The axial location of the plane-parallel plate 207 has no impact on optical performance, meaning it can be moved back and forth along the optical axis A1 without changing the aberration correction.

In the example attachment 100 of FIG. 2, the image plane 208 is located 73.363 mm from the 80 mm objective lens 201. This means that the lens system 10 has a vertex length that is 7.319 mm shorter than the objective lens 201 alone plus the same plane parallel plate 207. Both lens elements 203 and 206 are made from high index crown glasses in order to minimize aberrations and to keep attachment 100 as compact as possible. Lens element 205 is made from a highly dispersive flint glass in order to correct chromatic aberrations. In addition, lens element 206 is made from an anomalous dispersion high-index crown glass (e.g. S-PHM52), which aids in correcting lateral chromatic aberration.

In Example 2, lens group G1 has the single negative element 202; lens group G2 has the positive cemented doublet comprising 203 and 204; lens group G3 has the single negative element 205; and lens group G4 has the positive single element 206. By using a cemented doublet construction for lens group G2, field curvature has been reduced. This field curvature correction has been further enhanced (i.e., reduced) by forming lens element 204 from a low index crown glass (e.g. Ohara S-FSL5).

Example 2 has a magnification M of 0.64×, which means that it reduces the focal length by a factor of 0.64 and it also increases the relative aperture of the objective lens 201 by 1.29 stops. For example, if the attachment 100 is placed behind a 100 mm f/2.8 objective lens 201, the resulting lens system 10 has a focal length of 64 mm and an aperture of f/1.8. The image circle of the objective lens 201 is also reduced by a factor of 0.64. This means that in order to take full advantage of the 18.2 mm diameter image circle capacity of Example 2, the objective lens 201 must have an image circle diameter of at least 18.2/0.64=28.4 mm. Since all FX format SLR objective lenses covering a standard 24×36 mm format and DX format SLR objective lenses covering a standard 18×24 mm format have an image circle diameter greater than 28.4 mm there are a large number of suitable objective lenses 201 to choose from.

Detailed prescription data for Example 2 is given in Table 2a below. Specification data for Example 2 is given in Table 2b below.

TABLE 2a

Prescription Data for Example 2

| Surf | Type | Radius | Thickness | Glass | Diameter |
|---|---|---|---|---|---|
| OBJ | STANDARD | Infinity | Infinity | | 0 |
| STO | PARAXIAL | — | 45.3 | | 71.42133 |
| 2 | STANDARD | 75 | 1.3 | S-FSL5 | 32.6 |
| 3 | STANDARD | −233.6561 | 0.25 | | 31.6 |
| 4 | STANDARD | 20.73988 | 7.180307 | H-ZLAF50B | 27.6 |
| 5 | STANDARD | −351.7024 | 1 | S-FSL5 | 27.6 |
| 6 | STANDARD | 63.76828 | 0.9401441 | | 24.7608 |
| 7 | STANDARD | 280.6475 | 1 | H-ZF3 | 24.7608 |
| 8 | STANDARD | 14.52462 | 2.273535 | | 21.5 |
| 9 | STANDARD | 24.47597 | 4.055247 | S-PHM52 | 21.5 |
| 10 | STANDARD | −152.7538 | 2.8 | | 21.5 |
| 11 | STANDARD | Infinity | 2 | S-NSL36 | 20 |
| 12 | STANDARD | Infinity | 5.263794 | | 20 |
| IMA | STANDARD | Infinity | | | 18.2 |

TABLE 2b

Specification Data for Example 2
EXAMPLE 2 - SPECIFICATIONS

| | |
|---|---|
| Focal Length | 64.9 mm |
| Magnification | 0.64x |
| Aperture Ratio | f/0.79 |
| Image Diagonal | 18.2 mm |
| CvOb2 | 0.04822 mm$^{-1}$ |
| CvIm3 | 0.06885 mm$^{-1}$ |
| Q1 | 7.60 |
| VT | 18.00 mm |
| Q2 | 0.28 |
| $\phi_{G1}$ | −0.004402 mm$^{-1}$ |
| Q3 | −0.2857 |

Example 3

Figure 3:
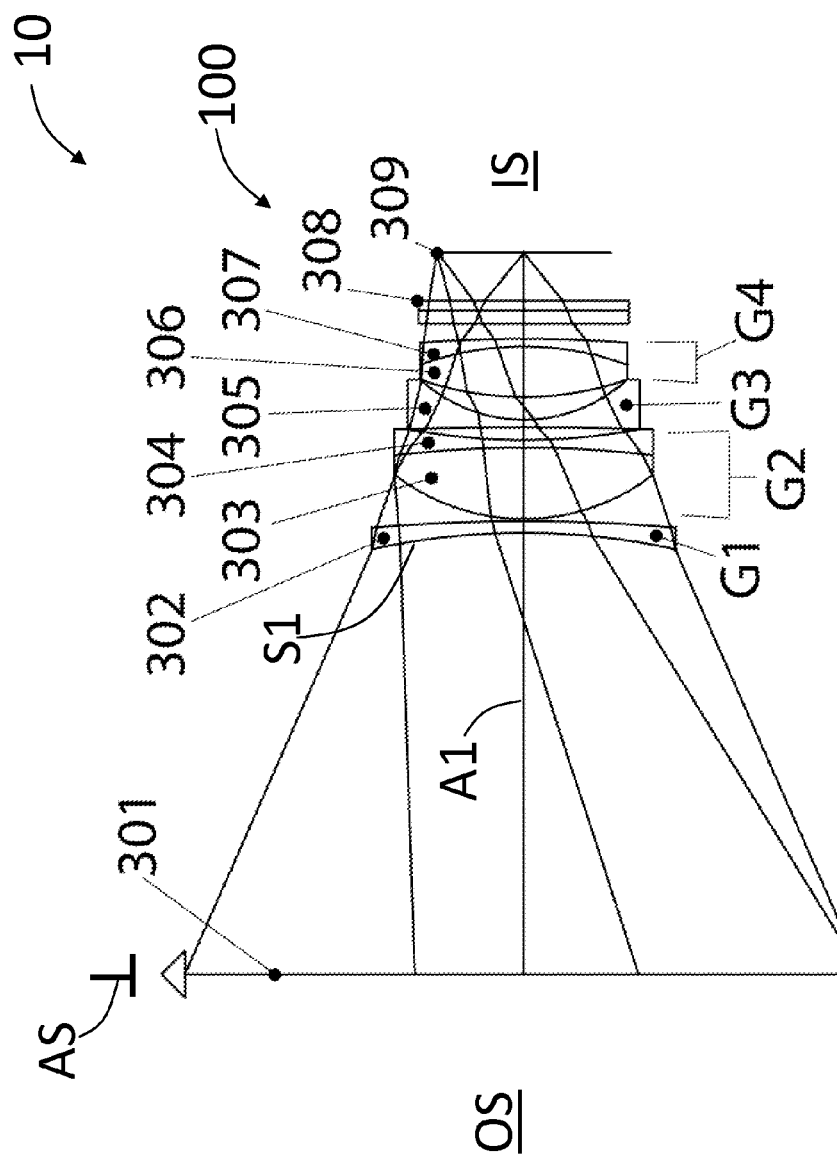
FIG. 3 is an optical layout of Example #3.

FIG. 3 is a layout of Example 3 of the present disclosure, which is an example attachment 100 having an axis A1, an aperture stop AS, an object side OS, and an image plane 309 that defines an image side IS. The example attachment 100 has a focal length f of 58.1 mm and a magnification M of 0.64x. In order to evaluate optical performance, an objective lens 301 is included. For modeling purposes, the objective lens 301 is treated paraxially and in Example 3 has a focal length of 80 mm, with the objective lens 301 being placed 45.97 mm toward the object side OS of the attachment 100. The combination of the objective lens 301 and attachment 100 defines a lens system 10.

Although the aperture stop AS for the attachment 100 is shown as being coincident with the objective lens 301 for the purpose of aberration evaluation, it may be moved axially over a wide range of values so that it will correspond with the exit pupil location of an actual attached objective lens. In practice, the attached objective lens 301 will normally determine the actual location of the aperture stop AS and system exit pupil since it will generally have an iris mechanism (not shown). Example 3 is designed to be compatible with a wide range of objective lens exit pupil distances.

The example attachment 100 of FIG. 3 comprises six (powered) optical elements 302 through 307 in order from the object side OS to the image side IS: 1) a weak negative element 302 with a concave object-facing surface S1; 2) a strong positive meniscus cemented doublet comprising a bi-convex positive element 303 and a bi-concave negative element 304; 3) a strong negative meniscus element 305; and 4) a positive cemented doublet comprising a bi-convex positive element 306 and a meniscus negative element 307.

A cemented plane-parallel plate structure 308 is optionally operably disposed immediately adjacent image plane 309 to represent a filter stack in the lens system 10. The filter stack can comprise at least one of a coverglass, an anti-aliasing filter, and an IR absorbing filter. The axial location of the plane-parallel plate structure 308 has no impact on optical performance, meaning it can be moved back and forth along the optical axis A1 without changing the aberration correction.

In the example attachment 100 of FIG. 3, the image plane 309 is located 75.150 mm from the 80 mm objective lens 301. This means that the lens system 10 has a vertex length that is 5.677 mm shorter than the objective lens 301 alone plus the same plane parallel plate structure 308. Both lens elements 303 and 306 are made from high index crown glasses in order to minimize aberrations and to keep attachment 100 as compact as possible. Lens element 305 is made from a highly dispersive flint glass in order to correct chromatic aberrations.

In Example 3 lens group G1 has the single negative element 302; lens group G2 has the positive cemented doublet comprising lens elements 303 and 304; lens group G3 has the single negative element 305; and lens group G4 has the positive cemented doublet comprising lens elements 306 and 307. By using a cemented doublet construction for lens group G2 field curvature, coma, and other aberrations have been reduced. Field curvature correction has been further enhanced (i.e., reduced) by forming lens element 304 from a low index crown glass (e.g., Chengdu H-QK3L). Using a doublet construction for lens group G4 helps to reduce lateral chromatic aberration, astigmatism, and other aberrations.

Example 3 has a magnification M of 0.64x, which means that it reduces the focal length by a factor of 0.64 and it also increases the relative aperture of the objective lens 301 by 1.29 stops. For example, if the attachment 100 is placed behind a 100 mm f/2.8 objective lens 301 the resulting lens system 10 has a focal length of 64 mm and an aperture of f/1.8. The image circle of the objective lens 301 is also reduced by a factor of 0.64, which means that in order to take full advantage of the 18.2 mm diameter image circle capacity of Example 3 the objective lens must have an image circle diameter of at least 18.2/0.64=28.4 mm. Since all FX format SLR objective lenses covering a standard 24×36 mm format and DX format SLR objective lenses covering a standard 18×24 mm format have an image circle diameter greater than 28.4 mm there are a large number of suitable objective lenses to choose from.

Detailed prescription data for Example 3 is given in Table 3a below. Specification data for Example 3 is given in Table 3b below.

TABLE 3a

Prescription Data for Example 3

| Surf | Type | Radius | Thickness | Glass | Diameter |
|------|------|--------|-----------|-------|----------|
| OBJ | STANDARD | Infinity | Infinity | | 0 |
| STO | PARAXIAL | — | 45.97 | | 70.96606 |
| 2 | STANDARD | −75 | 1.2 | H-QK3L | 31.8 |
| 3 | STANDARD | −189.5686 | 0.25 | | 31 |
| 4 | STANDARD | 22.16127 | 7.424136 | H-ZLAF50B | 27.1 |
| 5 | STANDARD | −112.7663 | 0.8 | H-QK3L | 27.1 |
| 6 | STANDARD | 66.79233 | 1.305117 | | 24.2936 |
| 7 | STANDARD | −385.7083 | 0.8 | H-ZF3 | 24.2936 |
| 8 | STANDARD | 16.09684 | 2.365359 | | 21.6582 |
| 9 | STANDARD | 33.09505 | 5.25 | H-ZLAF50B | 21.6582 |
| 10 | STANDARD | −31.93147 | 0.8 | S-TIH10 | 21.6582 |
| 11 | STANDARD | −149.0304 | 1.576523 | | 21.6582 |
| 12 | STANDARD | Infinity | 1.4 | 1.530000, 50.000000 | 22 |
| 13 | STANDARD | Infinity | 1 | 1.520000, 50.000000 | 22 |
| 14 | STANDARD | Infinity | 5.009328 | | 22 |
| IMA | STANDARD | Infinity | | | 18.2 |

TABLE 3b

Specification Data for Example 3
EXAMPLE 3 - SPECIFICATIONS

| Focal Length | 58.1 mm |
| Magnification | 0.64x |
| Aperture Ratio | f/0.79 |
| Image Diagonal | 18.2 mm |
| CvOb2 | 0.04512 mm$^{-1}$ |
| CvIm3 | 0.06212 mm$^{-1}$ |
| Q1 | 6.23 |
| VT | 18.59 mm |
| Q2 | 0.35 |
| $\phi_{G1}$ | −0.003915 mm$^{-1}$ |
| Q3 | −0.2275 |

Example 4

Figure 4:
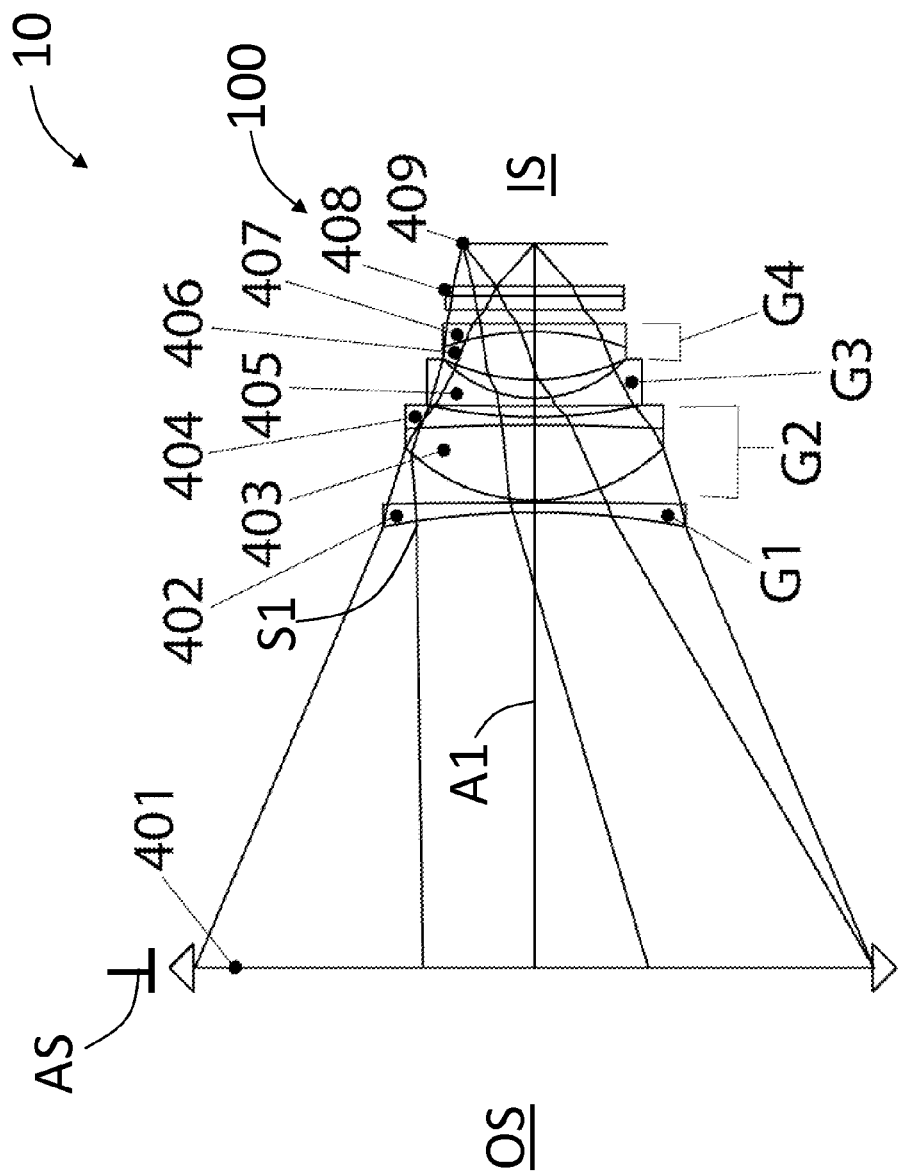
FIG. 4 is an optical layout of Example #4.

FIG. 4 is a layout of Example 4 of the present disclosure, which is an example attachment 100 having an axis A1, an aperture stop AS, an object side OS, and an image plane 409 that defines an image side IS. The example attachment 100 has a focal length f of 48.49 mm and a magnification M of 0.58x. In order to evaluate optical performance, an objective lens 401 is included. For modeling purposes, the objective lens 401 is treated paraxially and in Example 4 has a focal length of 80 mm, with the objective lens 401 being placed 45.8 mm toward the object side OS of the attachment 100. The combination of the objective lens 401 and attachment 100 defines a lens system 10.

Although the aperture stop AS for the attachment 100 is shown as being coincident with the objective lens 401 for the purpose of aberration evaluation, it may be moved axially over a wide range of values so that it will correspond with the exit pupil location of an actual attached objective lens. In practice, the attached objective lens 401 will normally determine the actual location of the aperture stop AS and system exit pupil since it will generally have an iris mechanism (not shown). Example 4 is designed to be compatible with a wide range of objective lens exit pupil distances.

The example attachment 100 of FIG. 4 comprises six (powered) optical elements 402 through 407 in order from the object side OS to the image side IS: 1) a weak negative element 402 with a concave object-facing surface S1; 2) a strong positive meniscus cemented doublet comprising a bi-convex positive element 403 and a bi-concave negative element 404; 3) a strong negative meniscus element 405; and 4) a positive cemented doublet comprising a bi-convex positive element 406 and a plano-concave negative element 407.

A cemented plane-parallel plate structure 408 is optionally operationally disposed immediately adjacent image plane 409 to represent a filter stack in the lens system 10. The filter stack can comprise at least one of a coverglass, an antialiasing filter, and an IR absorbing filter. The axial location of the plane parallel plate structure 408 has no impact on optical performance, meaning it can be moved back and forth along the optical axis A1 without changing the aberration correction.

In the example attachment 100 of FIG. 4, the image plane 409 is located 72.833 mm from the 80 mm objective lens 401. This means that the lens system 10 has a vertex length that is 7.994 mm shorter than the objective lens 401 alone plus the same parallel plate structure 408. Both lens elements 403 and 406 are made from high index crown glasses in order to minimize aberrations and to keep the attachment 100 as compact as possible. Lens element 405 is made from a highly dispersive flint glass in order to correct chromatic aberrations.

In Example 4, lens group G1 has the single negative element 402; lens group G2 has the positive cemented doublet comprising lens elements 403 and 404; lens group G3 has the single negative element 405; and lens group G4 has the positive cemented doublet comprising lens elements 406 and 407. By using a cemented doublet construction for lens group G2, field curvature, coma, and other aberrations have been reduced. This field curvature correction has been further enhanced (i.e., reduced) by forming lens element 304 from a low index crown glass (e.g., Chengdu H-QK3L). Using a doublet construction for lens group G4 helps to reduce lateral color, astigmatism, and other aberrations.

Example 4 has a magnification M of 0.58x, which means that it reduces the focal length by a factor of 0.58 and it also increases the relative aperture of the objective lens 401 by 1.57 stops. For example, if the attachment 100 is placed behind a 100 mm f/2.8 objective lens 401 the resulting lens system 10 has a focal length of 58 mm and an aperture of f/1.6. The image circle of the objective lens 401 is also reduced by a factor of 0.58, which means that in order to take full advantage of the 14.6 mm diameter image circle capacity of Example 4 the objective lens must have an image circle diameter of at least 14.6/0.58=25.2 mm. Since all FX format SLR objective lenses covering a standard 24×36 mm format and DX format SLR objective lenses covering a standard 18×24 mm format have an image circle diameter greater than 25.2 mm there are a large number of suitable objective lenses 401 to choose from.

Detailed prescription data for Example 4 is given in Table 4a below. Specification data for Example 4 is given in Table 4b below.

TABLE 4a

Prescription Data for Example 4

| Surf | Type | Radius | Thickness | Glass | Diameter |
|---|---|---|---|---|---|
| OBJ | STANDARD | Infinity | Infinity | | 0 |
| STO | PARAXIAL | — | 45.8 | | 68.65223 |
| 2 | STANDARD | −82 | 1 | H-QK3L | 30.6 |
| 3 | STANDARD | −656.0277 | 0.2 | | 29.7 |
| 4 | STANDARD | 18.66141 | 7.589029 | H-ZLAF50B | 26.1 |
| 5 | STANDARD | −223.1846 | 0.8 | H-QK3L | 26.1 |
| 6 | STANDARD | 49.40621 | 1.109966 | | 21.7368 |
| 7 | STANDARD | 589.0732 | 0.8 | H-ZF3 | 21.7368 |
| 8 | STANDARD | 12.84823 | 1.840076 | | 18.4906 |
| 9 | STANDARD | 21.52905 | 4.834939 | H-ZLAF50B | 18.4906 |
| 10 | STANDARD | −27.68768 | 0.8 | H-ZF4 | 18.4906 |
| 11 | STANDARD | Infinity | 1.4 | | 18.4906 |
| 12 | STANDARD | Infinity | 1.4 | 1.530000, 50.000000 | 18 |
| 13 | STANDARD | Infinity | 1 | 1.520000, 50.000000 | 18 |
| 14 | STANDARD | Infinity | 4.259328 | | 18 |
| IMA | STANDARD | Infinity | | | 14.6 |

TABLE 4b

Specification Data for Example 4
EXAMPLE 4 - SPECIFICATIONS

| | |
|---|---|
| Focal Length | 48.49 mm |
| Magnification | 0.58x |
| Aperture Ratio | f/0.74 |
| Image Diagonal | 14.6 mm |
| CvOb2 | 0.05359 mm$^{-1}$ |
| CvIm3 | 0.07783 mm$^{-1}$ |
| Q1 | 6.37 |
| VT | 18.97 mm |
| Q2 | 0.39 |
| $\phi_{G1}$ | −0.005199 mm$^{-1}$ |
| Q3 | −0.2521 |

Example 5

Figure 5:
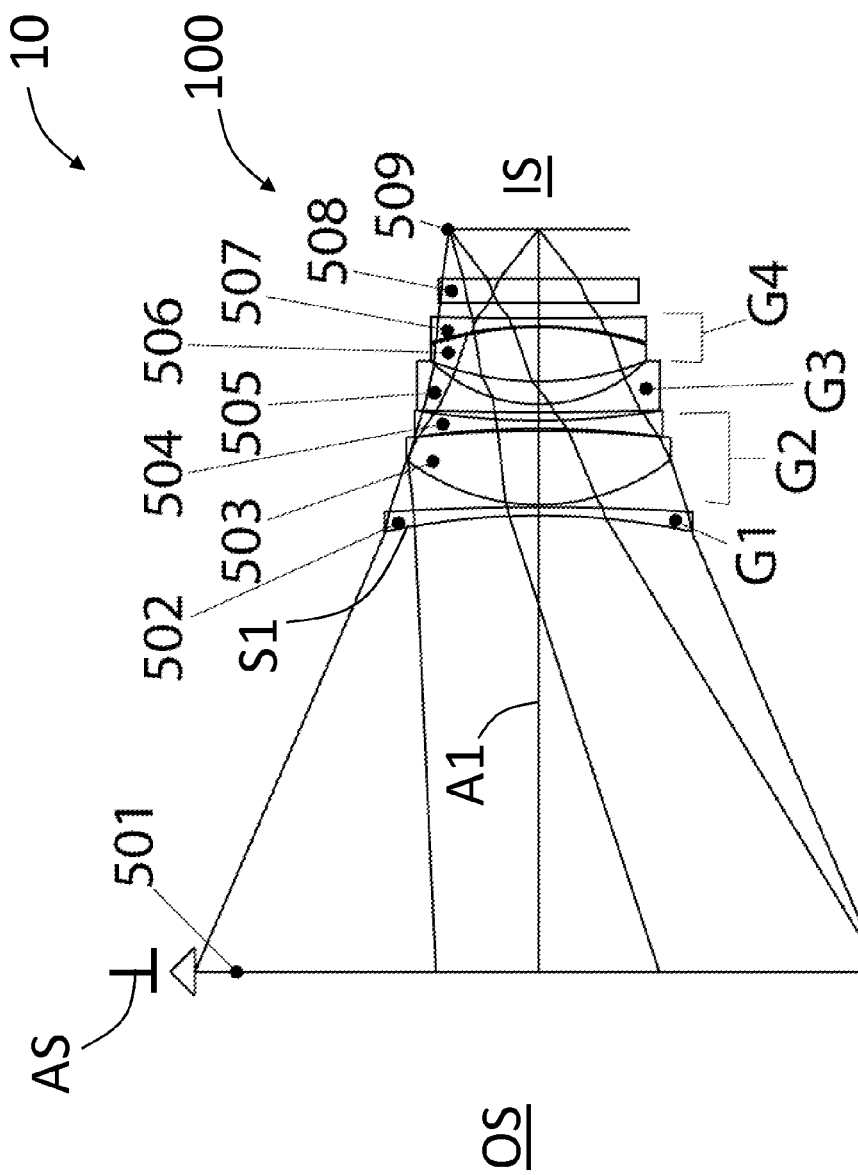
FIG. 5 is an optical layout of Example #5.

FIG. 5 is a layout of Example 5 of the present disclosure, which is an example attachment 100 having an axis A1, an aperture stop AS, an object side OS, and an image plane 509 that defines an image side IS. The example attachment 100 has a focal length f of 61.7 mm and a magnification M of 0.64x. In order to evaluate optical performance, an objective lens 501 is included. For modeling purposes the objective lens 501 is treated paraxially and in Example 5 has a focal length of 80 mm, with the objective lens 501 being placed 46.0 mm toward the object side OS of the optical attachment 100. The combination of the objective lens 501 and attachment 100 defines a lens system 10.

Although the aperture stop AS for the attachment 100 is shown as being coincident with the objective lens 501 for the purpose of aberration evaluation, it may be moved axially over a wide range of values so that it will correspond with the exit pupil location of an actual attached objective lens. In practice, the attached objective lens 501 will normally determine the actual location of the aperture stop AS and system exit pupil since it will generally have an iris mechanism (not shown). Example 5 is designed to be compatible with a wide range of objective lens exit pupil distances.

The example attachment 100 of FIG. 5 comprises six (powered) optical elements 502 through 507 in order from the object side OS to the image side IS: 1) a weak negative element 502 with a concave object-facing surface S1; 2) a strong positive meniscus air-spaced doublet comprising a bi-convex positive element 503 and a bi-concave negative element 504; 3) a strong negative meniscus element 505; and 4) a positive air-spaced doublet comprising a bi-convex positive element 506 and a meniscus negative element 507.

A plane-parallel plate 508 is optionally operably disposed immediately adjacent image plane 509 to represent a filter stack in the lens system 10. The filter stack can comprise at least one of a coverglass, an anti-aliasing filter, and an IR absorbing filter. The axial location of the plane parallel plate 508 has no impact on optical performance, meaning it can be moved back and forth along the optical axis A1 without changing the aberration correction.

In the example attachment 100 of FIG. 5, the image plane 509 is located 74.846 mm from the 80 mm objective lens 501, This means that the lens system 10 has a vertex length that is 5.985 mm shorter than the objective lens 501 alone plus the same plane parallel plate 508. Both lens elements 503 and 506 are made from high index crown glasses in order to minimize aberrations and to keep the attachment 100 as compact as possible. Lens element 505 is made from a highly dispersive flint glass in order to correct chromatic aberrations.

In Example 5, lens group G1 has the single negative element 502; lens group G2 has the positive air-spaced doublet comprising lens elements 503 and 504; lens group G3 has the single negative element 505; and lens group G4 has the positive air-spaced doublet comprising lens elements 506 and 507. By using a doublet construction for lens group G2, field curvature, coma, and other aberrations have been reduced. Field curvature correction has been further enhanced by forming lens element 504 from a low index crown glass (e.g., Chengdu H-QK3L). Using a doublet construction for lens group G4 helps to reduce lateral color, astigmatism, and other aberrations.

Example 5 is similar in many ways to Example 3 except that the cemented doublets in the latter have been replaced with air-spaced doublets. This permits additional degrees of freedom in the design process in order to correct aberrations. Additional combinations of air-spaced and cemented doublets will be readily apparent to anyone skilled in the art. For example, lens group G2 could be made to be a cemented doublet, while lens group G4 could be made to be an air-spaced doublet. Similarly, lens group G2 could be made to be an air-spaced doublet while lens group G4 could be made to be a cemented doublet.

Example 5 has a magnification M of 0.64×, which means that it reduces the focal length by a factor of 0.64 and it also increases the relative aperture of the objective lens 501 by 1.29 stops. For example, if the attachment 100 is placed behind a 100 mm f/2.8 objective lens 501 the resulting system 10 has a focal length of 64 mm and an aperture of f/1.8. The image circle of the objective lens 501 is also reduced by a factor of 0.64. This means that in order to take full advantage of the 18.2 mm diameter image circle capacity of Example 5 the objective lens 501 must have an image circle diameter of at least 18.2/0.64=28.4 mm. Since all FX format SLR objective lenses covering a standard 24×36 mm format and DX format SLR objective lenses covering a standard 18×24 mm format have an image circle diameter greater than 28.4 mm there are a large number of suitable objective lenses 501 to choose from.

Detailed prescription data for Example 5 is given in Table 5a below. Specification data for Example 5 is given in Table 5b below.

TABLE 5a

Prescription Data for Example 5

| Surf | Type | Radius | Thickness | Glass | Diameter |
|---|---|---|---|---|---|
| OBJ | STANDARD | Infinity | −80 | | 28.43112 |
| STO | STANDARD | Infinity | 46 | | 69.33787 |
| 2 | STANDARD | −75 | 0.85 | H-QK3L | 31.2 |
| 3 | STANDARD | 248.6149 | 0.25 | | 31.2 |
| 4 | STANDARD | −22.08537 | 7.43 | H-ZLAF50B | 26.8 |
| 5 | STANDARD | −130.4712 | 0.25 | | 26.8 |
| 6 | STANDARD | −92.63002 | 0.8 | H-QK3L | 25.14 |
| 7 | STANDARD | 76.69318 | 0.836605 | | 24.6 |
| 8 | STANDARD | 469.0494 | 0.8 | H-ZF3 | 24.6 |
| 9 | STANDARD | 15.84261 | 2.296554 | | 21.8 |
| 10 | STANDARD | 29.91555 | 5.45 | H-ZLAF50B | 21.8 |
| 11 | STANDARD | −34.5688 | 0.1232307 | | 21.8 |
| 12 | STANDARD | −37.58626 | 0.8 | S-TIH10 | 21.8 |
| 13 | STANDARD | 442.9984 | 1.55 | | 21 |
| 14 | STANDARD | Infinity | 2.4 | 1.530000, 50.000000 | 20.2226 |
| 15 | STANDARD | Infinity | 5.009328 | | 19.72578 |
| IMA | STANDARD | Infinity | | | 22.44124 |

TABLE 5b

Specification Data for Example 5
EXAMPLE 5 - SPECIFICATIONS

| | |
|---|---|
| Focal Length | 61.7 mm |
| Magnification | 0.64× |
| Aperture Ratio | f/0.79 |
| Image Diagonal | 18.2 mm |
| CvOb2 | 0.04528 mm$^{-1}$ |
| CvIm3 | 0.06312 mm$^{-1}$ |
| Q1 | 6.69 |
| VT | 19.89 mm |
| Q2 | 0.32 |
| $\phi_{G1}$ | −0.004532 mm$^{-1}$ |
| Q3 | −0.2796 |

Example 6

Figure 6:
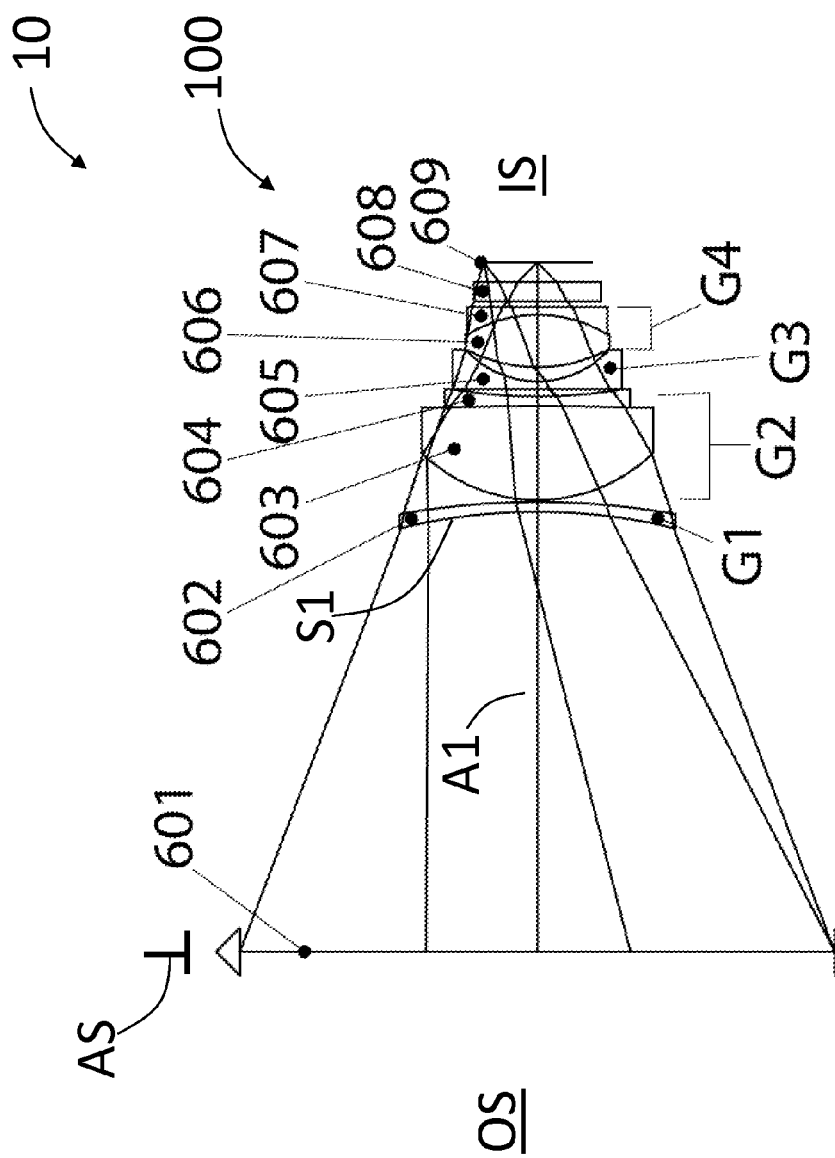
FIG. 6 is an optical layout of Example #6.

FIG. 6 is a layout of Example 6 of the present disclosure, which is an example attachment 100 having an axis A1, an aperture stop AS, an object side OS, and an image plane 609 that defines an image side IS. The example attachment 100 has a focal length f of 34.8 mm and a magnification M of 0.50×. In order to evaluate optical performance, an objective lens 601 is included. For modeling purposes, the objective lens 601 is treated paraxially and in Example 6 has a focal length of 80 mm, with the objective lens 601 being placed 45.0 mm toward the object side OS of the attachment 100. The combination of the objective lens 601 and attachment 100 defines a lens system 10.

Although the aperture stop AS for the attachment 100 is shown as being coincident with the objective lens 601 for the purpose of aberration evaluation, it may be moved axially over a wide range of values so that it will correspond with the exit pupil location of an actual attached objective lens. In practice, the attached objective lens 601 will normally determine the actual location of the aperture stop AS and system exit pupil since it will generally have an iris mechanism (not shown). Example 6 is designed to be compatible with a wide range of objective lens exit pupil distances.

The example attachment 100 of FIG. 6 comprises six (powered) optical elements 602 through 607 in order from the object side OS to the image side IS: 1) a weak negative element 602 with a concave object-facing surface S1; 2) a strong positive meniscus cemented doublet comprising a bi-convex positive element 603 and a bi-concave negative element 604; 3) a strong negative meniscus element 605; and 4) a positive cemented doublet comprising a bi-convex positive element 606 and a meniscus negative element 607.

A plane-parallel plate 608 is optionally operably disposed immediately adjacent image plane 609 to represent a filter stack in the lens system 10. The filter stack can comprise at least one of a coverglass, an anti-aliasing filter, and an IR absorbing filter. The axial location of the plane parallel plate 608 has no impact on optical performance, meaning it can be moved back and forth along the optical axis A1 without changing the aberration correction.

In the example attachment 100 of FIG. 6, the image plane 609 is located 70.528 mm from the 80 mm objective lens 601. This means that the lens system 10 has a vertex length that is 10.154 mm shorter than the objective lens 601 alone plus the same plane parallel plate 608. Both lens elements 603 and 606 are made from high index crown glasses in order to minimize aberrations and to keep the attachment 100 as compact as possible. Lens element 605 is made from a highly dispersive flint glass in order to correct chromatic aberrations.

In Example 6 lens group G1 has the single negative element 602; lens group G2 has the positive cemented doublet comprising lens elements 603 and 604; lens group G3 has the single negative element 605; and lens group G4 has the positive cemented doublet comprising lens elements 606 and 607. By using a cemented doublet construction for lens group G2, field curvature, coma, and other aberrations have been reduced. Field curvature correction has been further enhanced (i.e., reduced) by forming lens element 604 from a low index crown glass (e.g., Ohara S-NSL36). Using a doublet construction for G4 helps to reduce lateral color, astigmatism, and other aberrations.

Example 6 has a magnification M of 0.50×, which means that it reduces the focal length by a factor of 0.50 and it also increases the relative aperture of the objective lens 601 by 2.0 stops. For example, if the attachment 100 is placed behind a 50 mm f/1.4 objective lens 601 the resulting lens system 10 has a focal length of 25 mm and an aperture of f/0.7. The image circle of the objective lens 601 is also reduced by a factor of 0.5. This means that in order to take full advantage of the 11.0 mm diameter image circle capacity of Example 6 the objective lens 601 must have an image circle diameter of at least 11.0/0.50=22.0 mm. Since all FX format SLR objective lenses covering a standard 24×36 mm format and DX format SLR objective lenses covering a standard 18×24 mm format have an image circle diameter greater than 22.0 mm there are a large number of suitable objective lenses 601 to choose from.

Detailed prescription data for Example 6 is given in Table 6a below. Specification data for Example 6 is given in Table 6b below.

TABLE 6a

Prescription Data for Example 6

| Surf | Type | Radius | Thickness | Glass | Diameter |
|---|---|---|---|---|---|
| OBJ | STANDARD | Infinity | Infinity | | 0 |
| STO | PARAXIAL | — | 45 | | 61.19074 |
| 2 | STANDARD | −60 | 1 | H-QK3L | 28.4 |
| 3 | STANDARD | −81.56759 | 0.2 | | 28.4 |
| 4 | STANDARD | 17.07175 | 9.609858 | H-ZLAF50B | 23.8 |
| 5 | STANDARD | −327.6403 | 1 | S-NSL36 | 19.07624 |
| 6 | STANDARD | 53.34705 | 0.7371982 | | 17.44005 |
| 7 | STANDARD | 4605.03 | 0.8 | H-ZF3 | 17.40585 |
| 8 | STANDARD | 10.02375 | 1.4551 | | 14.79771 |
| 9 | STANDARD | 15.71186 | 5.34983 | H-ZLAF50B | 14.81617 |
| 10 | STANDARD | −13.79901 | 0.8 | H-ZF4 | 14.41334 |
| 11 | STANDARD | 1312.294 | 0.5759665 | | 13.40847 |
| 12 | STANDARD | Infinity | 2 | S-NSL36 | 13.06322 |
| 13 | STANDARD | Infinity | 2 | | 12.29674 |
| IMA | STANDARD | Infinity | | | 12.64692 |

TABLE 6b

Specification Data for Example 6
EXAMPLE 6 - SPECIFICATIONS

| | |
|---|---|
| Focal Length | 34.8 mm |
| Magnification | 0.50x |
| Aperture Ratio | f/0.707 |
| Image Diagonal | 11.0 mm |
| CvOb2 | 0.05858 mm$^{-1}$ |
| CvIm3 | 0.09976 mm$^{-1}$ |
| Q1 | 5.51 |
| VT | 20.95 mm |
| Q2 | 0.60 |
| $\phi_{G1}$ | −0.002116 mm$^{-1}$ |
| Q3 | −0.07358 |

Example 7

Figure 7:
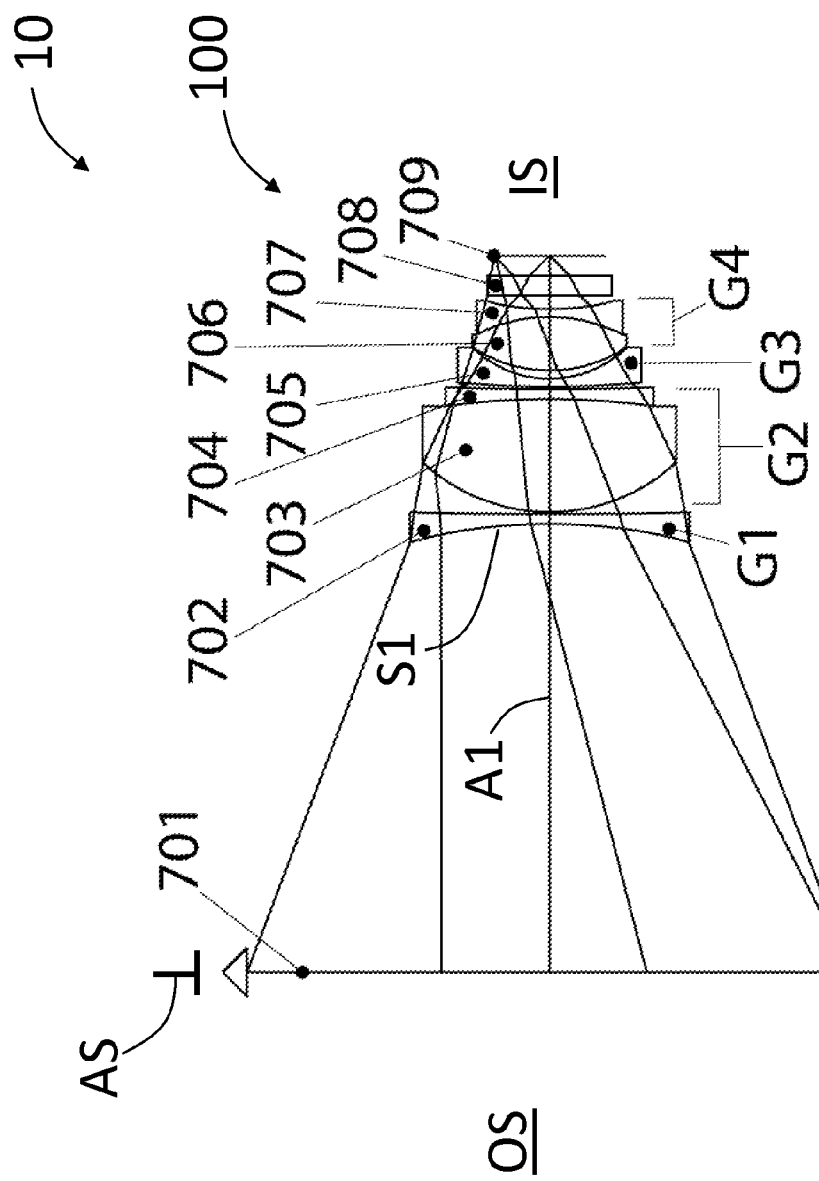
FIG. 7 is an optical layout of Example #7.

FIG. 7 is a layout of Example 7 of the present disclosure, which is an example attachment 100 having an axis A1, an aperture stop AS, an object side OS, and an image plane 709 that defines an image side IS. The example attachment 100 has a focal length f of 39.7 mm and a magnification M of 0.50×. In order to evaluate optical performance, an objective lens 701 is included. For modeling purposes the objective lens 701 is treated paraxially and in Example 7 has a focal length of 80 mm, with the objective lens 701 being placed 45.0 mm toward the object side OS of the optical attachment 100. The combination of the objective lens 701 and attachment 100 defines a lens system 10.

Although the aperture stop AS for the attachment 100 is shown as being coincident with the objective lens 701 for the purpose of aberration evaluation, it may be moved axially over a wide range of values so that it will correspond with the exit pupil location of an actual attached objective lens. In practice, the attached objective lens 701 will normally determine the actual location of the aperture stop AS and system exit pupil since it will generally have an iris mechanism (not shown). Example 7 is designed to be compatible with a wide range of objective lens exit pupil distances.

The example attachment 100 of FIG. 7 comprises six optical elements 702 through 707 in order from the object side OS to the image side IS: 1) a weak negative element 702 with a concave object-facing surface S1; 2) a strong positive meniscus cemented doublet comprising a bi-convex positive element 703 and a bi-concave negative element 704; 3) a strong negative meniscus element 705; and 4) a positive cemented doublet comprising a bi-convex positive element 706 and a meniscus negative element 707.

A plane-parallel plate 708 is optionally operably disposed immediately adjacent image plane 709 to represent a filter stack in the lens system 10. The filter stack can comprise at least one of a coverglass, an anti-aliasing filter, and an IR absorbing filter. The axial location of the plane-parallel plate 708 has no impact on optical performance, meaning it can be moved back and forth along the optical axis A1 without changing the aberration correction.

In the example attachment 100 of FIG. 7, the image plane 709 is located 71.935 mm from the 80 mm objective lens 701. This means that the lens system 10 has a vertex length that is 8.747 mm shorter than the objective lens 701 alone plus the same plane parallel plate 708. Both lens elements 703 and 706 are made from high index crown glasses in order to minimize aberrations and to keep the attachment 100 as compact as possible. Lens element 705 is made from a highly dispersive flint glass in order to correct chromatic aberrations.

In Example 7 lens group G1 has the single negative element 702; lens group G2 has the positive cemented doublet comprising lens elements 703 and 704; lens group G3 has the single negative element 705; and lens group G4 has the positive cemented doublet comprising lens elements 706 and 707. By using a cemented doublet construction for G2, field curvature, coma, and other aberrations have been reduced. Field curvature correction has been further enhanced (i.e., reduced) by forming lens element 704 from a low index crown glass (e.g., Ohara S-NSL36). Using a doublet construction for lens group G4 helps to reduce lateral color, astigmatism, and other aberrations.

In addition to compounding lens groups G2 and G4 into cemented doublets, Example 7 makes extensive use of aspheric surfaces in order to correct optical aberrations. Surfaces 2, 7 and 11 are aspheric, and as a result the design has exceptionally good optical correction even at an extreme magnification of 0.5× and aperture of f/0.7. The function of an individual aspheric surface varies to some degree based on how far it is located from the aperture stop and/or image plane. In example attachment 100 the aspheric surface 2 is located relatively far from the image plane 709 and close to the aperture stop AS, and as a result it mainly influences spherical aberration and coma. Surface 7 of attachment 100 has an intermediate distance from aperture stop AS and image plane 709, and as a result it mainly influences coma and astigmatism. Surface 11 of attachment 100 is relatively close to the image plane 709 and far from the aperture stop AS, and as a result it mainly influences astigmatism and distortion.

Example 7 has a magnification M of 0.50×, which means that it reduces the focal length by a factor of 0.50 and it also increases the relative aperture of the objective lens 701 by 2.0 stops. For example, if the attachment is placed behind a 50 mm f/1.4 objective lens 701 the resulting lens system 10 has a focal length of 25 mm and an aperture of f/0.7. The image circle of the objective lens 701 is also reduced by a factor of 0.50. This means that in order to take full advantage of the 11.0 mm diameter image circle capacity of Example 7 the objective lens must have an image circle diameter of at least 11.0/0.50=22.0 mm. Since all FX format SLR objective lenses covering a standard 24×36 mm format and DX format SLR objective lenses covering a standard 18×24 mm format have an image circle diameter greater than 28.4 mm there are a large number of suitable objective lenses 701 to choose from.

Detailed prescription data for Example 7 is given in Table 7a below. Specification data for Example 7 is given in Table 7b below. Data for aspheric surfaces #2, 7, and 11 is given below in Table 7c.

TABLE 7a

Prescription Data for Example 7

| Surf | Type | Radius | Thickness | Glass | Diameter |
|---|---|---|---|---|---|
| OBJ | STANDARD | Infinity | Infinity | | 0 |
| STO | PARAXIAL | — | 45 | | 61.06451 |
| 2 | EVENASPH | −60 | 1 | H-QK3L | 28.18404 |
| 3 | STANDARD | 603.8133 | 0.2 | | 27.40403 |
| 4 | STANDARD | 18.93216 | 11.33566 | H-ZLAF5OB | 25.56153 |
| 5 | STANDARD | −78.35576 | 1 | S-NSL36 | 20.99178 |
| 6 | STANDARD | 290.695 | 0.238818 | | 19.2842 |
| 7 | EVENASPH | 84.53827 | 0.8 | H-ZF3 | 18.51418 |
| 8 | STANDARD | 11.16767 | 0.8366905 | | 15.56716 |
| 9 | STANDARD | 14.07369 | 5.361905 | H-ZLAF5OB | 15.56276 |
| 10 | STANDARD | −16.26117 | 0.8 | H-ZF4 | 14.74124 |
| 11 | EVENASPH | 30.87694 | 1.346989 | | 12.81599 |
| 12 | STANDARD | Infinity | 2 | S-NSL36 | 12.5691 |
| 13 | STANDARD | Infinity | 2.013793 | | 11.94826 |
| IMA | STANDARD | Infinity | | | 11 |

TABLE 7b

Specification Data for Example 7
EXAMPLE 7 - SPECIFICATIONS

| Focal Length | 39.7 mm |
|---|---|
| Magnification | 0.50 × |
| Aperture Ratio | f/0.707 |
| Image Diagonal | 11.0 mm |
| CvOb2 | 0.05282 mm$^{-1}$ |
| CvIm3 | 0.08954 mm$^{-1}$ |
| Q1 | 5.65 |
| VT | 21.57 mm |
| Q2 | 0.54 |
| $\phi_{G1}$ | −0.008937 mm$^{-1}$ |
| Q3 | −0.3546 |

TABLE 7c

Aspheric Coefficients for Example 7

| Surface # | 2 | 7 | 11 |
|---|---|---|---|
| R | −60.000 | 84.538 | 30.877 |
| k | 0.0000 | 0.0000 | 0.0000 |
| C4 | −3.3279e−6 | −5.6768e−6 | 6.8077e−5 |
| C6 | −2.2191e−9 | −4.2817e−8 | 3.2745e−7 |
| C8 | −1.6533e−11 | −4.7970e−10 | −1.1473e−8 |
| C10 | 0.0000 | 1.4181e−12 | 4.5371e−10 |

Example 8

Figure 8:
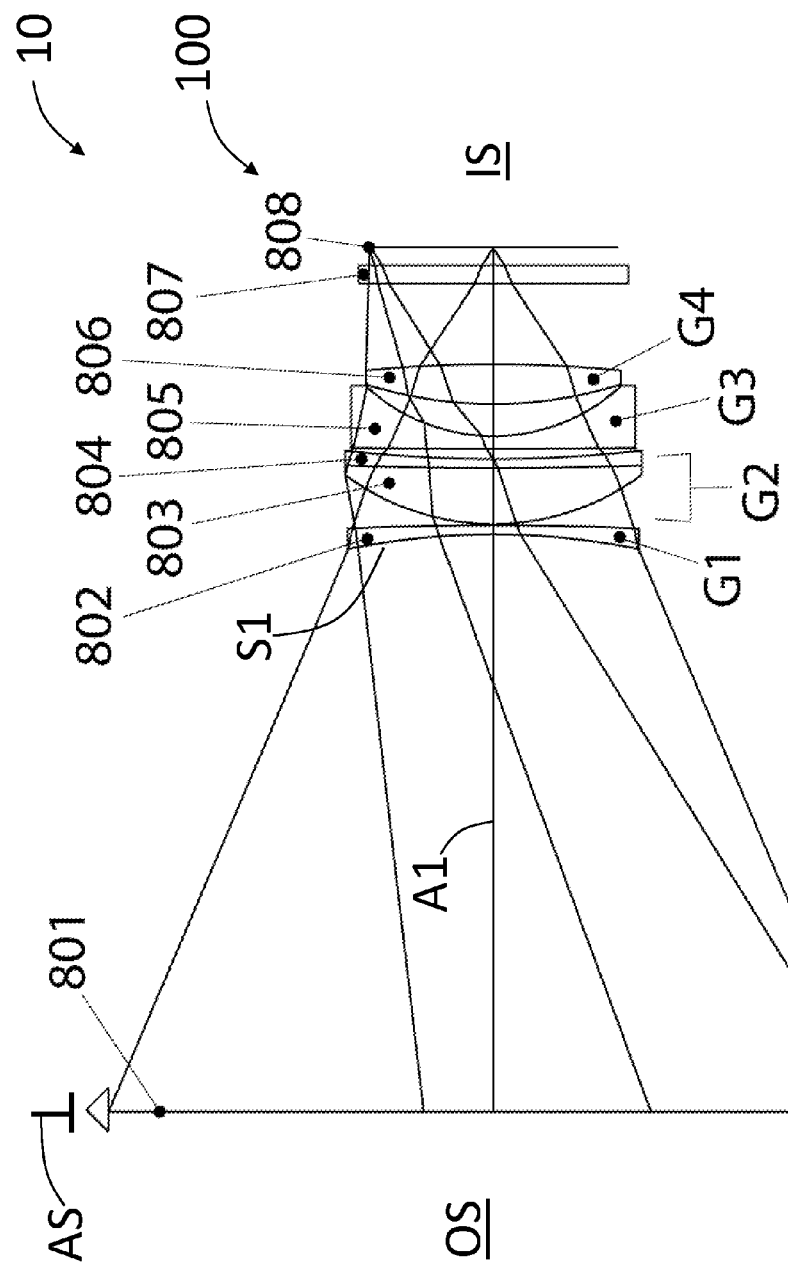
FIG. 8 is an optical layout of Example #8.

FIG. 8 is a layout of Example 8 of the present disclosure, which is an example attachment 100 having an axis A1, an aperture stop AS, an object side OS, and an image plane 808 that defines an image side IS. The example attachment 100 has a focal length f of 85.2 mm and a magnification M of 0.71×. In order to evaluate optical performance, an objective lens 801 is included. For modeling purposes, the objective lens 801 is treated paraxially and in Example 8 has a focal length of 100 mm, with the objective lens 801 being placed 63.9 mm toward the object side OS of the optical attachment 100. The combination of the objective lens 801 and attachment 100 defines a lens system 10.

Although the aperture stop AS for the attachment 100 is shown as being coincident with the objective lens 801 for the purpose of aberration evaluation, it may be moved axially over a wide range of values so that it will correspond with the exit pupil location of an actual attached objective lens. In practice, the attached objective lens 801 will normally determine the actual location of the aperture stop AS and system exit pupil since it will generally have an iris mechanism (not shown). Example 8 is designed to be compatible with a wide range of objective lens exit pupil distances.

The example attachment 100 of FIG. 8 comprises five optical elements 802 through 806 in order from the object side OS to the image side IS: 1) a weak negative element 802 with a concave object-facing surface S1; 2) a strong positive meniscus cemented doublet comprising a meniscus positive element 803 and a meniscus negative element 804; 3) a strong negative meniscus element 805; and 4) a positive element 806.

A plane-parallel plate 807 is optionally operably disposed immediately adjacent image plane 808 to represent a filter stack in the lens system 10. The filter stack can comprise at least one of a coverglass, an anti-aliasing filter, and an IR absorbing filter. The axial location of the plane-parallel plate 807 has no impact on optical performance, meaning it can be moved back and forth along the optical axis A1 without changing the aberration correction.

In the example attachment 100 of FIG. 8, the image plane 808 is located 95.672 mm from the 100 mm objective lens 801. This means that the lens system 10 has a vertex length that is 5.010 mm shorter than the objective lens 801 alone plus the same parallel plate 807. Both lens elements 803 and 806 are made from high index crown glasses in order to minimize aberrations and to keep the attachment 100 as compact as possible. Lens element 805 is made from a highly dispersive flint glass in order to correct chromatic aberrations.

In Example 8, lens group G1 has the single negative element 802; lens group G2 has the positive cemented doublet comprising lens elements 803 and 804; lens group G3 has the single negative element 805; and lens group G4 has the positive single element 806. By using a cemented doublet construction for G2 field curvature has been reduced. Field curvature correction has been further enhanced (i.e., reduced) by forming lens element 804 from a low index crown glass (e.g., Ohara S-NSL36).

Example 8 also makes use of an asphere on the object-facing surface of lens element 802. Since this is the surface closest to the attached lens (and hence closest to the aperture stop) the asphere helps primarily to correct coma and spherical aberration, although it also affects astigmatism, distortion, and other aberrations.

Example 8 has a magnification M of 0.71×, which means that it reduces the focal length by a factor of 0.71 and it also increases the relative aperture of the objective lens 801 by 1.0 stops. For example, if the attachment 100 is placed behind a 100 mm f/2.8 objective lens 801 the resulting lens system 10 has a focal length of 71 mm and an aperture of f/2.0. The image circle of the objective lens is also reduced by a factor of 0.71. This means that in order to take full advantage of the 27.6 mm diameter image circle capacity of Example 8, the objective lens 801 must have an image circle diameter of at least 27.6/0.71=38.9 mm. Since all FX format SLR objective lenses covering a standard 24×36 mm format have an image circle diameter much greater than 38.9 mm there are a large number of suitable objective lenses 801 to choose from.

Detailed prescription data for Example 8 is given in Table 8a below. Specification data for Example 8 is given in Table 8b below. Data for aspheric surface #2 is given below in Table 8c.

TABLE 8a

Prescription Data for Example 8

| Surf | Type | Radius | Thickness | Glass | Diameter |
|---|---|---|---|---|---|
| OBJ | STANDARD | Infinity | Infinity | | 0 |
| STO | PARAXIAL | — | 63.9 | | 85.62818 |
| 2 | EVENASPH | −80 | 1 | S-FSL5 | 32.4 |
| 3 | STANDARD | −374.7709 | 0.15 | | 32.4 |
| 4 | STANDARD | 27.74944 | 6.2 | S-LAH58 | 33 |
| 5 | STANDARD | 472.4275 | 1 | S-NSL36 | 33 |
| 6 | STANDARD | 144.8605 | 1.124342 | | 31.8 |
| 7 | STANDARD | 1272.061 | 1.4 | S-TIH10 | 31.6 |
| 8 | STANDARD | 20.92073 | 3.567814 | | 28.4 |
| 9 | STANDARD | 47.75996 | 4.4 | S-LAL18 | 28.4 |
| 10 | STANDARD | −144.5784 | 8.93 | | 28.4 |
| 11 | STANDARD | Infinity | 2 | S-NSL36 | 30 |
| 12 | STANDARD | Infinity | 2 | | 30 |
| IMA | STANDARD | Infinity | | | 27.6 |

TABLE 8b

Specification Data for Example 8
EXAMPLE 7 - SPECIFICATIONS

| | |
|---|---|
| Focal Length | 85.2 mm |
| Magnification | 0.71 × |
| Aperture Ratio | f/0.90 |
| Image Diagonal | 27.6 mm |
| CvOb2 | 0.03604 mm$^{-1}$ |
| CvIm3 | 0.04780 mm$^{-1}$ |
| Q1 | 7.14 |
| VT | 18.84 mm |
| Q2 | 0.22 |
| $\phi_{G1}$ | −0.004788 mm$^{-1}$ |
| Q3 | −0.4077 |

TABLE 8c

Aspheric Coefficients for Example 8

| Surface # | 2 |
|---|---|
| R | −80.000 |
| k | 0.0000 |
| C4 | 6.1221e-7 |
| C6 | 2.400e-10 |
| C8 | 1.0663e-12 |
| C10 | 0.0000 |

Example 9

Figure 9:
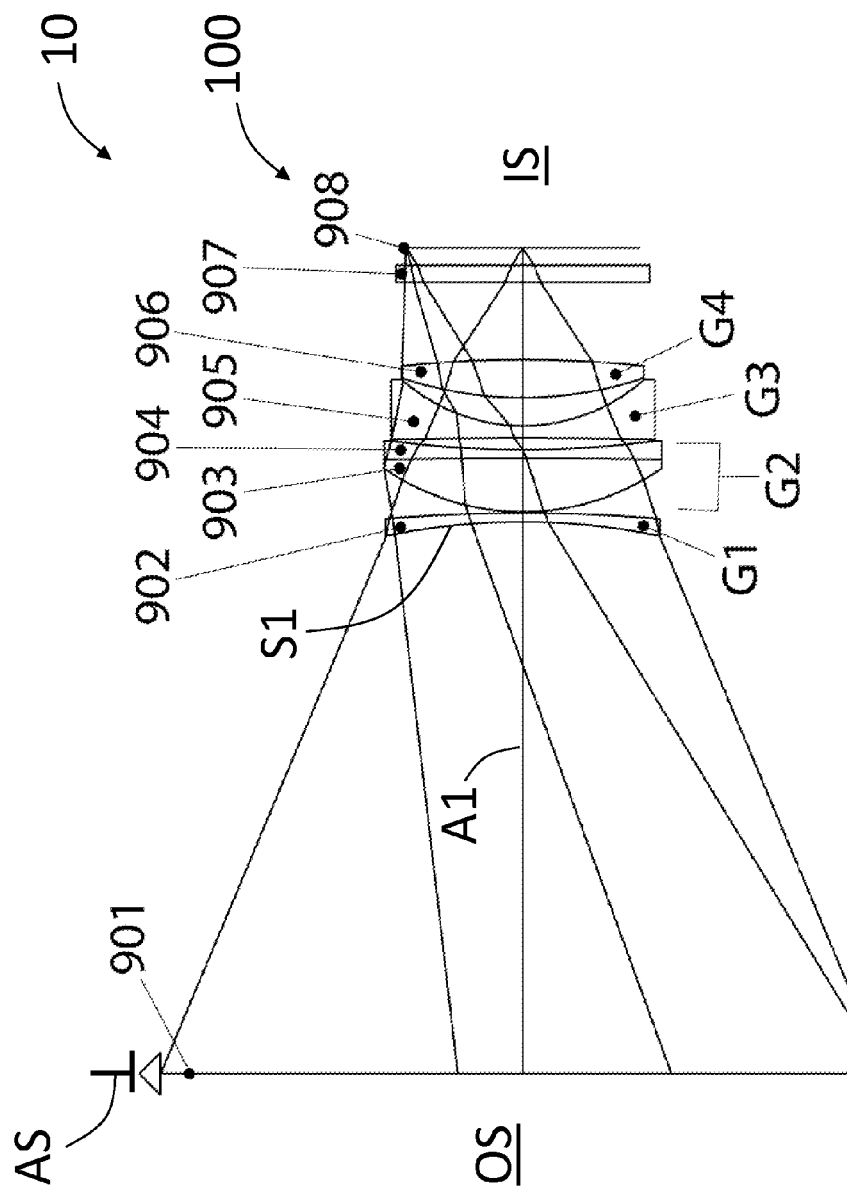
FIG. 9 is an optical layout of Example #9.

FIG. 9 is a layout of Example 9 of the present disclosure, which is an example attachment 100 having an axis A1, an aperture stop AS, an object side OS, and an image plane 908 that defines an image side IS. The example attachment 100 has a focal length f of 85.7 mm and a magnification M of 0.71×. In order to evaluate optical performance, an objective lens 901 is included. For modeling purposes, the objective lens 901 is treated paraxially and in Example 9 has a focal length of 100 mm, with the objective lens 901 being placed 63.9 mm toward the object side OS of the optical attachment 100. The combination of the objective lens 901 and attachment 100 defines a lens system 10.

Although the aperture stop AS for the attachment 100 is shown as being coincident with the objective lens 901 for the purpose of aberration evaluation, it may be moved axially over a wide range of values so that it will correspond with the exit pupil location of an actual attached objective lens. In practice, the attached objective lens 901 will normally determine the actual location of the aperture stop AS and system exit pupil since it will generally have an iris mechanism (not shown). Example 9 is designed to be compatible with a wide range of objective lens exit pupil distances.

The example attachment 100 in FIG. 9 comprises five optical elements 902 through 906 in order from the object side OS to the image side IS: 1) a weak negative element 902 with a concave object-facing surface S1; 2) a strong positive meniscus cemented doublet comprising a meniscus positive element 903 and a meniscus negative element 904; 3) a strong negative bi-concave element 905; and 4) a positive element 906.

A plane-parallel plate 907 is optionally operably disposed immediately adjacent image plane 908 to represent a filter stack in the lens system 10. The filter stack can comprise at least one of a coverglass, an anti-aliasing filter, and an IR absorbing filter. The axial location of the plane parallel plate 907 has no impact on optical performance, meaning it can be moved back and forth along the optical axis A1 without changing the aberration correction.

In the example attachment 100 of FIG. 9, the image plane 908 is located 95.603 mm from the 100 mm objective lens 901. This means that the lens system 10 has a vertex length that is 5.079 mm shorter than the objective lens 901 alone plus the same parallel plate 907. Both lens elements 903 and 906 are made from high index crown glasses in order to minimize aberrations and to keep the attachment 100 as compact as possible. Lens element 905 is made from a highly dispersive flint glass in order to correct chromatic aberrations.

In Example 9, lens group G1 has the single negative element 902; lens group G2 has the positive cemented doublet comprising lens elements 903 and 904; lens group G3 has the single negative element 905; and lens group G4 has the positive single element 906. By using a cemented doublet construction for lens group G2 field curvature has been reduced. Field curvature correction has been further enhanced (i.e., reduced) by forming lens element 904 from a low index crown glass (e.g., Ohara S-NSL36).

Example 9 also makes use of an asphere on the object-facing surface of lens element 905. Since this surface is near the middle of the focal reducer it has a significant effect on all aberrations, but its primary role is to correct coma and astigmatism.

Example 9 has a magnification M of 0.71×, which means that it reduces the focal length by a factor of 0.71 and it also increases the relative aperture of the objective lens 901 by 1.0 stops. For example, if the attachment 100 is placed behind a 100 mm f/2.8 objective lens 901 the resulting lens system 10 has a focal length of 71 mm and an aperture of f/2.0. The image circle of the objective lens is also reduced by a factor of 0.71. This means that in order to take full advantage of the 27.6 mm diameter image circle capacity of Example 9 the objective lens must have an image circle diameter of at least 27.6/0.71=38.9 mm. Since all FX format SLR objective lenses covering a standard 24×36 mm format have an image circle diameter much greater than 38.9 mm there are a large number of suitable objective lenses 901 to choose from.

Detailed prescription data for Example 9 is given in Table 9a below. Specification data for Example 9 is given in Table 9b below. Data for the aspheric surface #7 is given in table 9c below.

TABLE 9a

Prescription Data for Example 9

| Surf | Type | Radius | Thickness | Glass | Diameter |
|---|---|---|---|---|---|
| OBJ | STANDARD | Infinity | Infinity | | 0 |
| STO | PARAXIAL | — | 63.9 | | 85.59319 |
| 2 | STANDARD | −80 | 1 | S-FSL5 | 32.4 |
| 3 | STANDARD | −201.4488 | 0.15 | | 32.4 |
| 4 | STANDARD | 29.21714 | 6.2 | S-LAH58 | 32.8 |
| 5 | STANDARD | −1029.681 | 1 | S-NSL36 | 32.8 |
| 6 | STANDARD | 121.4998 | 1.358913 | | 31.2 |
| 7 | EVENASPH | −420.5984 | 1.4 | S-TIH10 | 31.2 |
| 8 | STANDARD | 21.77999 | 3.263887 | | 28.6 |
| 9 | STANDARD | 45.94214 | 4.4 | S-LAL18 | 28.6 |
| 10 | STANDARD | −136.6514 | 8.93 | | 28.6 |
| 11 | STANDARD | Infinity | 2 | S-NSL36 | 30 |
| 12 | STANDARD | Infinity | 2 | | 30 |
| IMA | STANDARD | Infinity | | | 27.6 |

TABLE 9b

Specification Data for Example 9
EXAMPLE 7 - SPECIFICATIONS

| Focal Length | 85.7 mm |
|---|---|
| Magnification | 0.71 × |
| Aperture Ratio | f/0.90 |
| Image Diagonal | 27.6 mm |
| CvOb2 | 0.03423 mm$^{-1}$ |
| CvIm3 | 0.04591 mm$^{-1}$ |
| Q1 | 6.87 |
| VT | 18.77 mm |
| Q2 | 0.22 |
| φ$_{G1}$ | −0.003664 mm$^{-1}$ |
| Q3 | −0.3140 |

TABLE 9c

Aspheric Coefficients for Example 9

| Surface # | 7 |
|---|---|
| R | −420.598 |
| k | 0.0000 |
| C4 | 2.4676e−6 |
| C6 | −4.7766e−10 |
| C8 | −3.6013e−12 |
| C10 | 0.0000 |

Example 10

Figure 10:
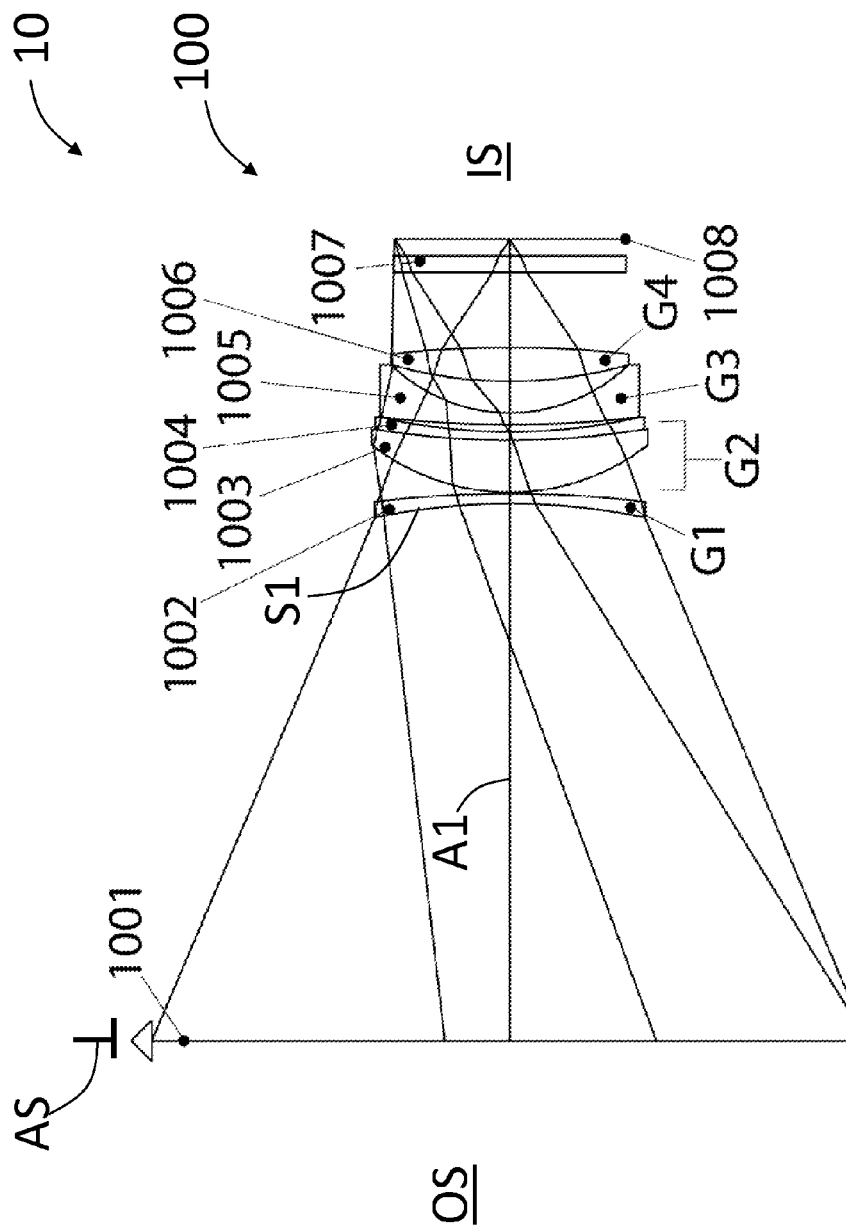
FIG. 10 is an example optical a layout of Example #10.

FIG. 10 is a layout of Example 10 of the present disclosure, which is an example attachment 100 having an axis A1, an aperture stop AS, an object side OS, and an image plane 1008 that defines an image side IS. The example attachment 100 has a focal length f of 87.5 mm and a magnification M of 0.71×. In order to evaluate optical performance, an objective lens 1001 is included. For modeling purposes, the objective lens 1001 is treated paraxially and in Example 10 has a focal length of 100 mm, with the objective lens 1001 being placed 63.9 mm toward the object side OS of the optical attachment 100. The combination of the objective lens 1001 and attachment 100 defines a lens system 10.

Although the aperture stop AS for the attachment 100 is shown as being coincident with the objective lens 1001 for the purpose of aberration evaluation, it may be moved axially over a wide range of values so that it will correspond with the exit pupil location of an actual attached objective lens. In practice, the attached objective lens 1001 will normally determine the actual location of the aperture stop AS and system exit pupil since it will generally have an iris mechanism (not shown). Example 10 is designed to be compatible with a wide range of objective lens exit pupil distances.

The example attachment 100 of FIG. 10 comprises five (powered) optical elements 1002 through 1006 in order from the object side OS to the image side IS: 1) a weak negative element 1002 with a concave object-facing surface S1; 2) a strong positive meniscus cemented doublet comprising a meniscus positive element 1003 and a meniscus negative element 1004; 3) a strong negative meniscus element 1005; and 4) a positive element 1006.

A plane-parallel plate 1007 is optionally operably disposed immediately adjacent image plane 1008 to represent a filter stack in the lens system 10. The filter stack can comprise at least one of a coverglass, an anti-aliasing filter, and an IR absorbing filter. The axial location of the plane parallel plate 1007 has no impact on optical performance, meaning it can be moved back and forth along the optical axis A1 without changing the aberration correction.

In the example attachment 100 of FIG. 10, the image plane 1008 is located 95.387 mm from the 100 mm objective lens 1001. This means that the lens system 10 has a vertex length that is 5.295 mm shorter than the objective lens 1001 alone plus the same plane parallel plate 1007. Both lens elements 1003 and 1006 are made from high index crown glasses in order to minimize aberrations and to keep the attachment 100 as compact as possible. Lens element 1005 is made from a highly dispersive flint glass in order to correct chromatic aberrations.

In Example 10, lens group G1 has the single negative element 1002; lens group G2 has the positive cemented doublet comprising lens elements 1003 and 1004; lens group G3 has the single negative element 1005; and lens group G4 has the positive single element 1006. By using a cemented doublet construction for lens group G2 field curvature has been reduced. Field curvature correction has been further enhanced (i.e., reduced) by forming element 1004 from a low index crown glass (e.g., Ohara S-NSL36).

Example 10 also makes use of an asphere on the image-facing surface of lens element 1006. Since this is the surface closest to the image plane (and hence furthest from the aperture stop) the asphere helps primarily to correct distortion and astigmatism, although it also affects coma, spherical aberration, and other aberrations.

Example 10 has a magnification M of 0.71×, which means that it reduces the focal length by a factor of 0.71 and it also increases the relative aperture of the objective lens 1001 by 1.0 stops. For example, if the attachment 100 is placed behind a 100 mm f/2.8 objective lens 1001 the resulting lens system 10 has a focal length of 71 mm and an aperture of f/2.0. The image circle of the objective lens 1001 is also reduced by a factor of 0.71. This means that in order to take full advantage of the 27.6 mm diameter image circle capacity of Example 10 the objective lens 1001 must have an image circle diameter of at least 27.6/0.71=38.9 mm. Since all FX format SLR objective lenses covering a standard 24×36 mm format have an image circle diameter much greater than 38.9 mm there are a large number of suitable objective lenses to choose from.

Detailed prescription data for Example 10 is given in Table 8a below. Specification data for Example 10 is given in Table 10b below. Data for the aspheric surface #10 is given in Table 10c below.

TABLE 10a

Prescription Data for Example 10

| Surf | Type | Radius | Thickness | Glass | Diameter |
|---|---|---|---|---|---|
| OBJ | STANDARD | Infinity | Infinity | | 0 |
| STO | PARAXIAL | — | 63.9 | | 85.64026 |
| 2 | STANDARD | −80 | 1.2 | S-FSL5 | 32.4 |
| 3 | STANDARD | −133.4058 | 0.15 | | 32.4 |
| 4 | STANDARD | 27.02282 | 6.2 | S-LAH58 | 33.0 |
| 5 | STANDARD | 100 | 1 | S-NSL36 | 32.2 |
| 6 | STANDARD | 70 | 0.8587894 | | 31.0 |
| 7 | STANDARD | 136.4188 | 1.4 | S-TIH10 | 31.0 |
| 8 | STANDARD | 20.51679 | 3.747707 | | 28.4 |
| 9 | STANDARD | 52.06887 | 4 | S-LAL18 | 28.4 |
| 10 | EVENASPH | −147.228 | 8.93 | | 28.4 |
| 11 | STANDARD | Infinity | 2 | S-NSL36 | 30.0 |
| 12 | STANDARD | Infinity | 2 | | 30.0 |
| IMA | STANDARD | Infinity | | | 27.6 |

TABLE 10b

Specification Data for Example 10
EXAMPLE 7 - SPECIFICATIONS

| Focal Length | 87.5 mm |
|---|---|
| Magnification | 0.71 × |
| Aperture Ratio | f/0.90 |
| Image Diagonal | 27.6 mm |
| CvOb2 | 0.03701 mm$^{-1}$ |
| CvIm3 | 0.04874 mm$^{-1}$ |
| Q1 | 7.50 |
| VT | 18.56 mm |
| Q2 | 0.21 |
| $\phi_{G1}$ | −0.002421 mm$^{-1}$ |
| Q3 | −0.2119 |

TABLE 10c

Aspheric Coefficients for Example 10

| Surface # | 10 |
|---|---|
| R | −147.228 |
| k | 0.0000 |
| C4 | −1.2464E−6 |
| C6 | −5.9582E−9 |
| C8 | 3.8694E−12 |
| C10 | 0.0000 |

Example 11

Figure 11:
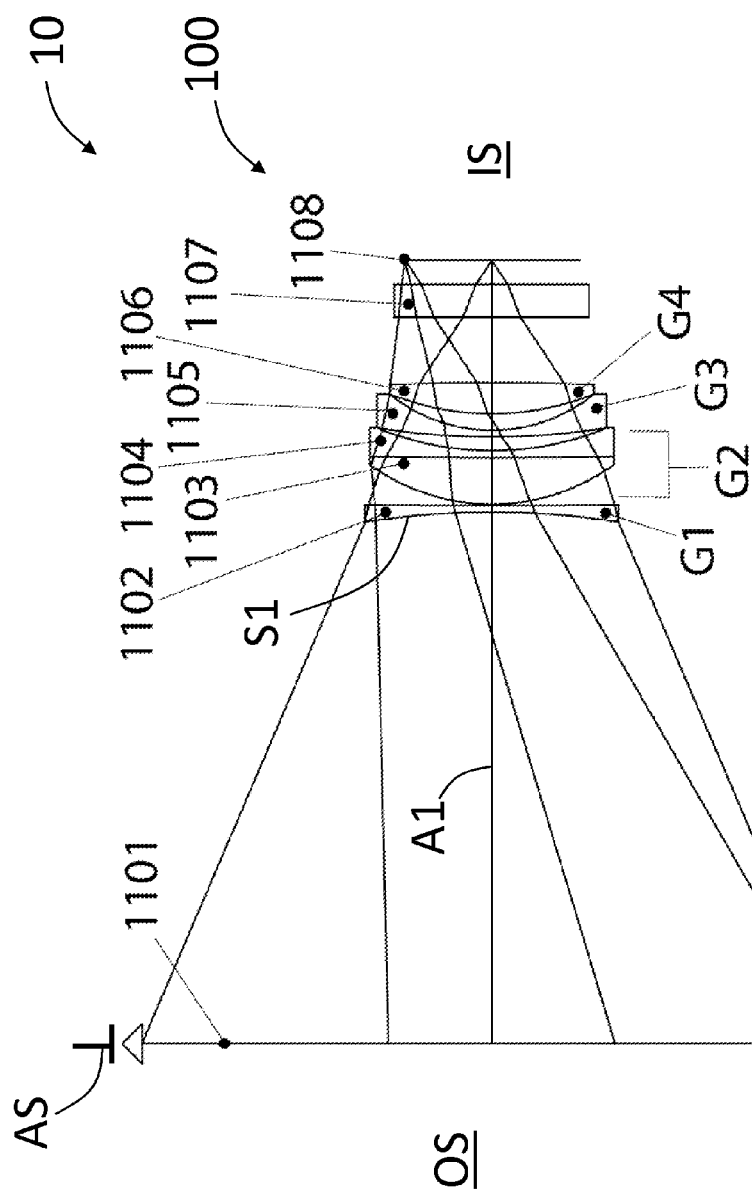
FIG. 11 is an optical layout of Example #11.

FIG. 11 is a layout of Example 11 of the present disclosure, which is a focal reducing attachment ("attachment") having an axis A1, an aperture stop AS, an object side OS, an image plane 1108 that defines an image side IS. The example attachment 100 has a focal length f of 90.6 mm and a magnification M of 0.71×. In order to evaluate optical performance, an objective lens 1101 is included. For modeling purposes, the objective lens 1101 is treated paraxially and in Example 11 has a focal length of 100 mm, with the objective lens 1101 being placed 65.0 mm toward the object side OS of the optical attachment 100. The combination of the objective lens 1101 and attachment 100 defines a lens system 10.

Although the aperture stop AS for the attachment 100 is shown as being coincident with the objective lens 1101 for the purpose of aberration evaluation, it may be moved axially over a wide range of values so that it will correspond with the exit pupil location of an actual attached objective lens. In practice, the attached objective lens 1101 will normally determine the actual location of the aperture stop AS and system exit pupil since it will generally have an iris mechanism (not shown). Example 11 is designed to be compatible with a wide range of objective lens exit pupil distances.

The attachment 100 of FIG. 11 comprises five optical elements 1102 through 1106 in order from the object side OS to the image side IS: 1) a weak negative element 1102 with a concave object-facing surface S1; 2) a strong positive meniscus cemented doublet comprising a meniscus positive element 1103 and a meniscus negative element 1104; 3) a strong negative meniscus element 1105; and 4) a positive element 1106.

A plane-parallel plate 1107 is optionally operably disposed immediately adjacent image plane 1108 to represent a filter stack in the lens system 10. The filter stack can comprise at least one of a coverglass, an anti-aliasing filter, and an IR absorbing filter. The axial location of the plane parallel plate 1107 has no impact on optical performance, meaning it can be moved back and forth along the optical axis A1 without changing the aberration correction.

In the example attachment 100 of FIG. 11, the image plane 1108 is located 95.837 mm from the 100 mm objective lens 1101. This means that the lens system 10 has a vertex length that is 5.527 mm shorter than the objective lens 1101 alone plus the same plane parallel plate 1107. Both lens elements 1103 and 1106 are made from high index crown glasses in order to minimize aberrations and to keep the attachment 100 as compact as possible. Lens element 1105 is made from a highly dispersive flint glass in order to correct chromatic aberrations.

In Example 11, lens group G1 has the single negative element 1102; lens group G2 has the positive cemented doublet comprising lens elements 1103 and 1104; lens group G3 has the single negative element 1105; and lens group G4 has the positive single element 1106. By using a cemented doublet construction for lens group G2 field curvature has been reduced. Field curvature correction has been further enhanced (i.e., reduced) by forming lens element 1104 from a flint glass (e.g., Chengdu H-F1) with a refractive index that is low compared to the refractive index of lens element 1103.

Example 11 has a magnification M of 0.71×, which means that it reduces the focal length by a factor of 0.71 and it also increases the relative aperture of the objective lens 1101 by 1.0 stops. For example, if the attachment 100 is placed behind a 100 mm f/2.8 objective lens 1101 the resulting lens system 10 has a focal length of 71 mm and an aperture of f/2.0. The image circle of the objective lens 1101 is also reduced by a factor of 0.71. This means that in order to take full advantage of the 27.6 mm diameter image circle capacity of Example 11 the objective lens 1101 must have an image circle diameter of at least 21.6/0.71=30.4 mm. Since all FX format SLR objective lenses covering a standard 24×36 mm format have an image circle diameter much greater than 38.9 mm there are a large number of suitable objective lenses 1101 to choose from.

Figure 12:
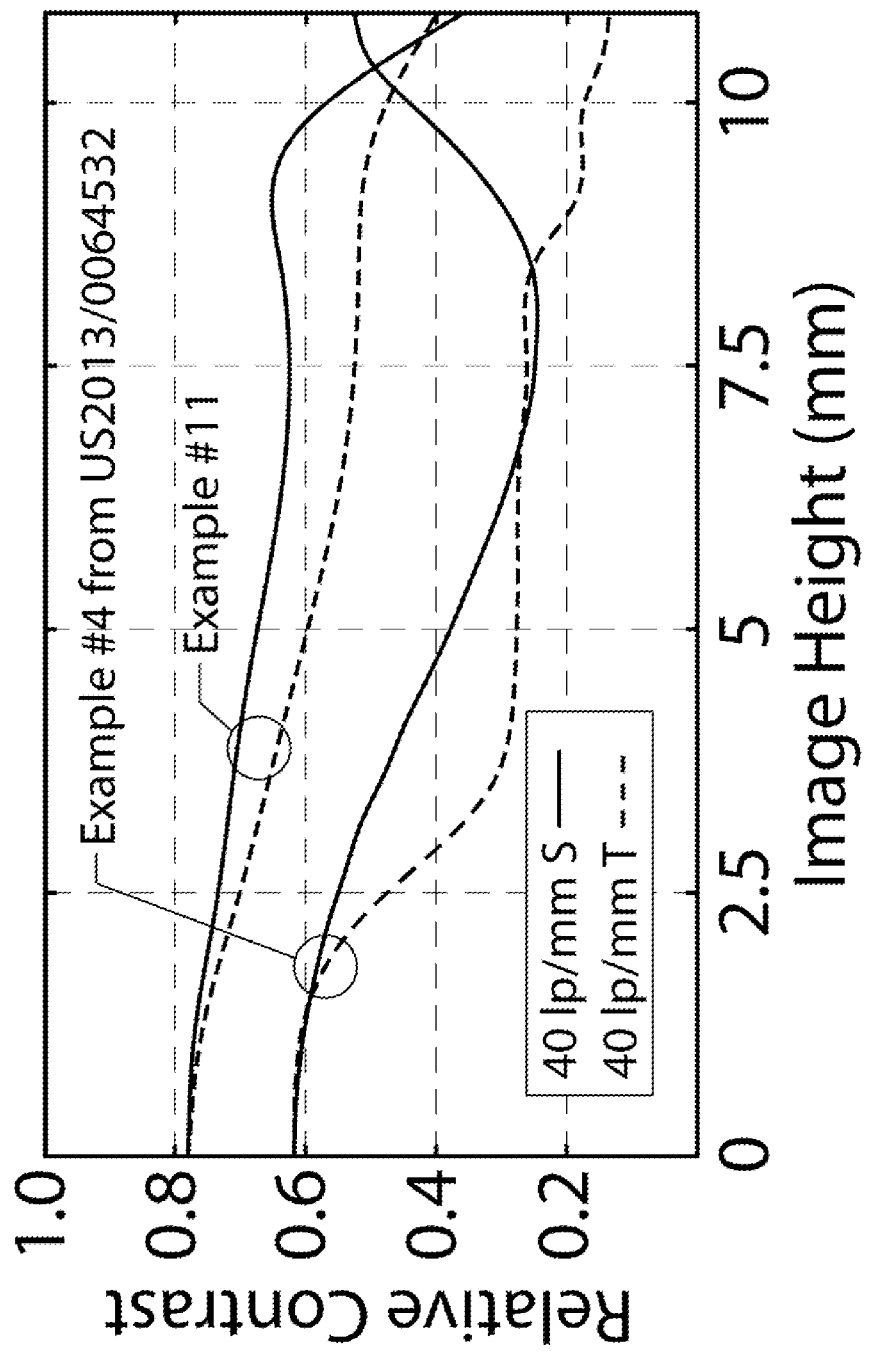
FIG. 12 is a plot of MTF vs. Image Height comparing the performance of Example #11 to that of Example #4 of US2013/0064532.

Example 11 provides a particularly good example of how the present disclosure enables improved optical performance compared to US2013/0064532. Example #4 of US2013/0064532 corresponds to an actual production design of a 0.71× micro four thirds focal reducer currently sold on the photographic market. This design has been widely acclaimed for its good aberration correction, and it is a good representation of what can be achieved by the design technology disclosed in US2013/0064532. However, Example 11 of the present disclosure represents a significant improvement over Example #4 of US2013/0064532. FIG. 12 shows a comparison of the MTF vs. Image Height at 40 line pairs per millimeter for Example 11 of the present disclosure and Example 4 of US2013/0064532. As can be seen in FIG. 12, Example 11 has significantly better performance across the entire image field.

Detailed prescription data for Example 11 is given in Table 11a below. Specification data for Example 11 is given in Table 11b below.

TABLE 11a

Prescription Data for Example 11

| Surf | Type | Radius | Thickness | Glass | Diameter |
|------|------|--------|-----------|-------|----------|
| OBJ | STANDARD | Infinity | Infinity | | |
| STO | PARAXIAL | — | 65.0 | | 86.062 |
| 2 | STANDARD | −100 | 0.8 | H-QK3L | 31.2 |
| 3 | STANDARD | 1653.785 | 0.15 | | 31.2 |
| 4 | STANDARD | 25.587 | 5.7 | H-ZLAF68 | 30.0 |
| 5 | STANDARD | 1029.995 | 0.85 | H-F1 | 30.0 |
| 6 | STANDARD | 36.961 | 1.705966 | | 28.2 |
| 7 | STANDARD | 91.789 | 0.8 | H-ZF4 | 28.2 |
| 8 | STANDARD | 20.035 | 2.031525 | | 25.1 |
| 9 | STANDARD | 34.181 | 3.8 | H-LAK52 | 25.1 |
| 10 | EVENASPH | −298.969 | 8.0 | | 25.1 |
| 11 | STANDARD | Infinity | 4.0 | H-KF6 | 24.0 |
| 12 | STANDARD | Infinity | 3.0 | | 24.0 |
| IMA | STANDARD | Infinity | | | 21.6 |

TABLE 11b

Specification Data for Example 11
EXAMPLE 7 - SPECIFICATIONS

| | |
|---|---|
| Focal Length | 90.6 mm |
| Magnification | 0.71 × |
| Aperture Ratio | f/0.90 |
| Image Diagonal | 21.6 mm |
| CvOb2 | 0.03908 mm$^{-1}$ |
| CvIm3 | 0.04991 mm$^{-1}$ |
| Q1 | 8.06 |
| VT | 15.84 mm |
| Q2 | 0.17 |
| $\phi_{G1}$ | −0.0051705 mm$^{-1}$ |
| Q3 | −0.4684 |

TABLE 12

Index and Dispersion Values for the Glasses Used in the Examples

| GLASS | MANUFACTURER | INDEX, $n_d$ | DISPERSION, $V_d$ |
|-------|--------------|-------------|-------------------|
| S-FSL5 | Ohara | 1.48749 | 70.24 |
| S-NSL36 | Ohara | 1.51742 | 52.43 |
| S-PHM52 | Ohara | 1.61800 | 63.33 |

TABLE 12-continued

Index and Dispersion Values for the Glasses Used in the Examples

| GLASS | MANUFACTURER | INDEX, $n_d$ | DISPERSION, $V_d$ |
|---|---|---|---|
| S-TIH10 | Ohara | 1.72825 | 28.46 |
| S-LAL18 | Ohara | 1.72916 | 54.68 |
| S-NBH51 | Ohara | 1.74950 | 35.33 |
| S-LAH66 | Ohara | 1.77250 | 49.60 |
| S-LAH58 | Ohara | 1.88300 | 40.77 |
| H-QK3L | Chengdu | 1.48749 | 70.42 |
| H-KF6 | Chengdu | 1.51742 | 52.19 |
| H-F1 | Chengdu | 1.60342 | 38.01 |
| H-ZF3 | Chengdu | 1.71736 | 29.51 |
| H-ZF4 | Chengdu | 1.72825 | 28.32 |
| H-LAK52 | Chengdu | 1.72916 | 54.67 |
| H-ZLAF50B | Chengdu | 1.80401 | 46.57 |
| H-ZLAF68 | Chengdu | 1.88300 | 40.81 |

Camera System

Figure 13:
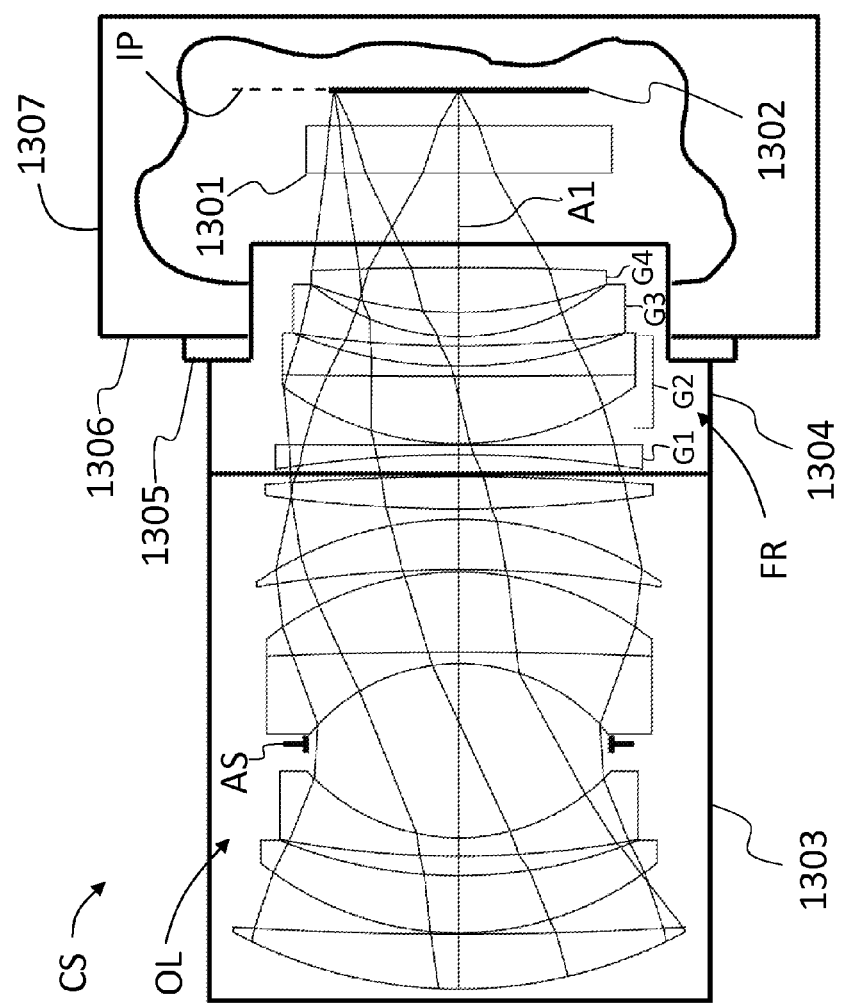
FIG. 13 is a schematic diagram of an example camera system that includes an objective lens, the focal-reducing attachment as disclosed herein, and a camera body.

FIG. 13 is a schematic diagram of an example camera system CS that includes an objective lens OL, a camera body 1306, and a focal reducer FR as disclosed herein operably disposed between the objective lens OL and the camera body 1306 so that the combined focal length is less than that of objective lens OL. The combined objective lens OL and focal reducer FR is mounted to a mounting flange 1305 of camera body 1306 and has an axis A1. Camera body 1306 has an interior 1307 that contains an image sensor 1302 arranged at an image plane IP and a filter pack 1301 arranged along axis A1 and mounted within the camera body interior. Image sensor 1302 defines the image side of the combined lens system of objective lens OL and focal reducer FR.

The objective lens OL will normally have an aperture stop AS coincident with an iris mechanism (not shown) that serves as the aperture stop for the lens system comprising the objective lens OL and focal reducer FR. However, it is also possible to place an iris mechanism in the focal reducer FR so that the aperture stop AS is located within the focal reducer FR.

Although mirrorless cameras typically have a relatively short permissible working distance, this distance is still on the order of 10 mm or more due to various filters and other mechanical obstructions placed in front of the sensor. FIG. 13 schematically illustrates mechanical mounts 1303 and 1304 for the objective lens OL and focal reducer FR, respectively.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A focal reducing attachment having an object side, an image side, an optical power $\phi$, a magnification M, and comprising:
   a total of five or six lens elements arranged in four lens groups G1, G2, G3 and G4 in order from the object side to the image side, and wherein:
   a) lens group G1 has an optical power $\phi_{G1}$, wherein $-1<\phi_{G1}/\phi<-0.001$, and including a most object-side-wise negative lens element that defines a most object-side-wise concave surface;
   b) lens group G2 has positive power and has a positive lens element with a most object-side facing surface having a curvature CvOb2;
   c) lens group G3 having negative power and having a negative lens element with a most image-side-facing surface having a curvature CvIm3;
   d) a positive powered lens group G4; and
   wherein $2<(CvOb2+CvIm3)/\phi<30$ and $0.3<M<1.0$.

2. A focal reducing attachment according to claim 1 in which any one of the four lens groups G1, G2, G3 and G4 comprises a cemented or air-spaced doublet.

3. A focal reducing attachment according to claim 1 in which any two of the four lens groups G1, G2, G3 and G4 comprises a cemented or air-spaced doublet.

4. A focal reducing attachment according to claim 1 in which lens group G2 comprises a cemented or air-spaced doublet, and in which lens groups G1, G3, and G4 each consists of a single lens element.

5. A focal reducing attachment according to claim 1 in which group G4 comprises a cemented or air-spaced doublet and in which lens groups G1, G2 and G3 each consists of a single element.

6. A focal reducing attachment according to claim 1 in which both lens groups G2 and G4 comprise either a cemented doublet or an air-spaced doublet, and in which lens groups G1 and G3 each consists of a single element.

7. A focal reducing attachment according to claim 1, wherein the magnification M is in the range $0.45<M<0.9$.

8. A focal reducing attachment according to claim 1, wherein the lens group G4 includes a most image-side-wise surface that is either plano or convex.

9. A focal reducing attachment according to claim 1, wherein VT a vertex length, and wherein $0.05<VT\cdot\phi<1.0$.

10. A focal reducing attachment according to claim 1, wherein $0.15<VT\cdot\phi<0.65$.

11. A focal reducing attachment according to claim 1, wherein the object side is configured to interface with an SLR lens and the image side is configured to interface with a mirrorless camera.

12. A lens system comprising:
   the focal reducing attachment of claim 1; and
   the objective lens operably attached to the focal reducer.

13. A camera system, comprising:
   the lens system of claim 12; and
   a mirrorless camera having a camera body with a mounting flange, wherein the lens system is operably attached to the camera body at the mounting flange.

14. A camera system according to claim 13, wherein the mirrorless camera includes a camera body having an interior in which the one or more parallel plates are disposed.

15. A focal reducing attachment according to claim 1, wherein the objective lens has a vertex length, and wherein the focal-reducing attachment and the objective lens define a combined vertex length that is less than the objective lens vertex length.

16. A focal reducing attachment for use with an objective lens and consisting
   of, in order from an object side to an image side:
   a first lens group G1 having a first negative power and a most object-side concave surface;
   a second lens group G2 having a first positive power and a most object-side surface having a curvature CvOb2;
   a third lens group G3 having a second negative power greater than the first negative power and having a most image-side surface having a curvature CvIm3;
   a fourth lens group G4 having a second positive power and a most image-side surface;
   one or more plane parallel plates that reside between the image sensor and the fourth lens element; and
   wherein the focal reducing attachment has an overall power $\phi$ such that $(CvOb2+CvIm3)/\phi>3$ and an overall magnification M such that $0.4 \leq M \leq 1$; and wherein at least one of the lens groups G2 or G4 comprises a cemented or air-spaced doublet.

17. The focal reducing attachment according to claim 16, wherein at least one of the one or more plane parallel plates comprises a filter.

18. A lens system comprising:
   the focal reducing attachment of claim 16; and
   the objective lens operably attached to the focal reducer.

* * * * *